US011109341B2

(12) United States Patent
Kim et al.

(10) Patent No.: US 11,109,341 B2
(45) Date of Patent: Aug. 31, 2021

(54) POSITION ESTIMATION DEVICE AND METHOD IN COMMUNICATION SYSTEM

(71) Applicant: Samsung Electronics Co., Ltd., Suwon-si (KR)

(72) Inventors: Sung-Hoon Kim, Seoul (KR); Hyuk-Joong Kwon, Suwon-si (KR); Jun-Hyung Kim, Yongin-si (KR); Jin-Young Hong, Yongin-si (KR); Jai-Ick Chun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/306,776

(22) PCT Filed: Jun. 2, 2017

(86) PCT No.: PCT/KR2017/005804
§ 371 (c)(1),
(2) Date: Dec. 3, 2018

(87) PCT Pub. No.: WO2017/209567
PCT Pub. Date: Dec. 7, 2017

(65) Prior Publication Data
US 2019/0141665 A1   May 9, 2019

(30) Foreign Application Priority Data
Jun. 3, 2016 (KR) .......................... 10-2016-0069206

(51) Int. Cl.
H04W 64/00 (2009.01)
H04W 8/22 (2009.01)
(Continued)

(52) U.S. Cl.
CPC .......... *H04W 64/003* (2013.01); *F24F 11/48* (2018.01); *F24F 11/50* (2018.01); *F24F 11/52* (2018.01);
(Continued)

(58) Field of Classification Search
CPC ..... H04W 64/003; H04W 4/20; H04W 4/023; H04W 4/70; H04W 84/18; H04W 8/22;
(Continued)

(56) References Cited

U.S. PATENT DOCUMENTS

2002/0049709 A1* 4/2002 Miyasaki ................ G06F 16/00
2005/0094610 A1* 5/2005 de Clerq ................ G08C 19/00
370/338
(Continued)

FOREIGN PATENT DOCUMENTS

EP    2 508 999 A1   10/2012
JP    2009-003896 A   1/2009
(Continued)

OTHER PUBLICATIONS

European Search Report dated Feb. 4, 2019 issued in European Patent Application No. 17807060.3.

*Primary Examiner* — Charles N Appiah
*Assistant Examiner* — Nicole M Louis-Fils
(74) *Attorney, Agent, or Firm* — Jefferson IP Law, LLP

(57) ABSTRACT

The present invention relates to a technology for a sensor network, machine to machine (M2M) communication, machine type communication (MTC), and Internet of things (IoT). The present invention may be used for an intelligent service (smart home, smart building, smart city, smart car or connected car, health care, digital education, retail business, security and safety-related service, etc.) on the basis of the technology described above. The present invention relates to an operation method of a device in a communication system, (Continued)

the method comprising a step of transmitting at least one among a device identifier (ID) of the device and position information of the device to another device, wherein the at least one among the device ID of the device and the position information of the device is registered in a server connected to the another device, and the device ID and the position information are generated on the basis of operation commands for the another device.

7 Claims, 13 Drawing Sheets

(51) Int. Cl.
| | | |
|---|---|---|
| *H04W 4/02* | (2018.01) | |
| *F24F 11/56* | (2018.01) | |
| *F24F 11/52* | (2018.01) | |
| *F24F 11/58* | (2018.01) | |
| *H04W 4/20* | (2018.01) | |
| *F24F 11/48* | (2018.01) | |
| *F24F 11/50* | (2018.01) | |
| *H04W 4/70* | (2018.01) | |
| *H04W 84/18* | (2009.01) | |
| *H04W 88/18* | (2009.01) | |
| *H04W 88/02* | (2009.01) | |

(52) U.S. Cl.
CPC .............. *F24F 11/56* (2018.01); *F24F 11/58* (2018.01); *H04W 4/02* (2013.01); *H04W 4/023* (2013.01); *H04W 4/20* (2013.01); *H04W 4/70* (2018.02); *H04W 8/22* (2013.01); *H04W 64/00* (2013.01); *H04W 84/18* (2013.01); *H04W 88/02* (2013.01); *H04W 88/18* (2013.01)

(58) Field of Classification Search
CPC ....... H04W 4/02; H04W 64/00; H04W 88/02; H04W 88/18; F24F 11/50; F24F 11/52; F24F 11/56; F24F 11/58; F24F 11/48
USPC ...................................................... 455/456.1
See application file for complete search history.

(56) References Cited

U.S. PATENT DOCUMENTS

| | | | |
|---|---|---|---|
| 2013/0297080 A1 | 11/2013 | Ko et al. | |
| 2013/0342399 A1* | 12/2013 | Fukuda | ..................... G01S 1/68 342/386 |
| 2014/0135036 A1* | 5/2014 | Bonanni | ............... H04W 4/023 455/456.3 |
| 2014/0342724 A1 | 11/2014 | Hill et al. | |
| 2015/0198938 A1* | 7/2015 | Steele | .................... G05B 15/02 700/275 |
| 2015/0262267 A1 | 9/2015 | Inoue et al. | |
| 2015/0358777 A1 | 12/2015 | Gupta | |
| 2015/0365787 A1* | 12/2015 | Farrell | .................. H04W 4/029 455/456.1 |
| 2016/0165570 A1* | 6/2016 | Kim | ...................... G01S 5/0027 455/456.2 |
| 2016/0198286 A1* | 7/2016 | Nakai | ..................... H04L 67/12 455/456.1 |
| 2017/0006471 A1 | 1/2017 | Kim et al. | |
| 2017/0041388 A1* | 2/2017 | Tai | ......................... G06Q 10/10 |
| 2017/0097621 A1* | 4/2017 | Ackmann | .............. G05B 15/02 |
| 2017/0195424 A1* | 7/2017 | Nasir | ...................... H04L 67/36 |

FOREIGN PATENT DOCUMENTS

| | | |
|---|---|---|
| JP | 2015-198284 A | 11/2015 |
| KR | 10-2003-0026530 A | 4/2003 |
| KR | 10-2012-0085118 A | 7/2012 |
| KR | 10-2014-0076948 A | 6/2014 |
| KR | 10-2015-0073827 A | 7/2015 |
| WO | 2015/187465 A1 | 12/2015 |

\* cited by examiner

POSITION ESTIMATION DEVICE AND METHOD IN COMMUNICATION SYSTEM

CROSS-REFERENCE TO RELATED APPLICATION(S)

This application is a U.S. National Stage application under 35 U.S.C. § 371 of an International application number PCT/KR2017/005804, filed on Jun. 2, 2017, which is based on and claimed priority of a Korean patent application number 10-2016-0069206, filed on Jun. 3, 2016, in the Korean Intellectual Property Office, the disclosure of which is incorporated by reference herein in its entirety.

BACKGROUND

1. Field

The present disclosure relates to an apparatus and method for estimating a location in a communication system.

2. Description of the Related Art

The Internet, which is a human centered connectivity network where humans generate and consume information, is now evolving into the internet of things (IoT), where distributed entities, such as things, exchange and process information without human intervention. The internet of everything (IoE), which is a combination of IoT technology and big data processing technology through connection with a cloud server, has emerged.

As technology elements, such as "sensing technology", "wired/wireless communication and network infrastructure", "service interface technology", and "security technology" are in demand for IoT implementation, a sensor network, machine-to-machine (M2M) communication, machine type communication (MTC), and so forth have been recently researched.

Such an IoT environment may provide intelligent Internet technology services that create new value for human life by collecting and analyzing data generated among connected things. IoT may be applied to a variety of fields including smart homes, smart buildings, smart cities, smart cars or connected cars, smart grids, health care, smart appliances, and advanced medical services through convergence and combination between existing information technology (IT) and various industrial applications.

Recently, there has been a growing demand for a system air-conditioner (SAC) which performs a cooling operation or heating operation for a large building where there are a plurality of separate spaces such as a hospital, a school, an office, a shop, an apartment, and/or the like by connecting a plurality of indoor units to each of one or more large outdoor units.

A process of registering an SAC in a general SAC system will be described with reference to FIG. 1.

FIG. 1 schematically illustrates a process of registering an SAC in a general SAC system.

Referring to FIG. 1, an SAC system includes an SAC 111, a server 113, a mobile device 115, and a mobile device 117.

The SAC 111 denotes an SAC which is newly installed at the SAC system. Here, an SAC denotes, for example, a set of one outdoor unit and one or more indoor units. The SAC 211 is a fixed device which is installed at a fixed location. The SAC system may include other SAC as well as the SAC 111.

The mobile device 115 denotes a mobile device of a system manager for the SAC system, and the mobile device 117 denotes a mobile device of an installer who installs the SAC 111. The system manager has modification authority for the SAC system.

When the SAC 111 is installed, the SAC 111 transmits, to the server 113, an SAC serial number (SN) as a kind of device identifier (ID) (at operation 121). Upon receiving the SAC SN from the SAC 111, the server 113 registers the SAC SN (at operation 123). The server 113 registers the received SAC SN in a device list, and the device list includes information about devices connected to the server 113.

After installing the SAC 111, the installer checks whether the SAC 111 operates normally by transmitting an operation command such as power on, power off, and/or the like for the SAC 111 with a remote controller (at operation 125). Based on the determined result, the installer informs the system manager of whether the SAC 111 operates normally and location information of the SAC 111 (at operation 127). The SAC 111 transmits, to the server 113, operation status information indicating the operation status which corresponds to the received operation command (at operation 129). The operation status information is transmitted along with an SAC SN of the SAC 111.

The system manager manually registers the SAC 111 at the server 113 based on whether the SAC 111 operates normally and the location information of the SAC 111 received from the installer (at operation 131). If the SAC 111 does not operate normally, the system manager does not need to register the SAC 111 at the server 113. The server 113 maps the location of the SAC 111 on a map which the server 113 manages based on the location information of the SAC 111 registered by the system manager (at operation 133).

In the case of performing a process of registering an SAC as described in FIG. 1, there is a need for a system manager who has authority to modify an SAC system and an installer as manpower for checking SAC installation.

Further, there is a need for a call, radio, and/or the/like between workers, e.g., an installer and a manager for detecting the exact location at which an SAC is practically installed.

A plurality of installers operate SACs at the same time, it may be difficult for a server to exactly identify the SACs.

Further, there may be significant time and cost required for registering a relatively large number of SACs when the relatively large number of SACs are registered at a server.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for estimating a location in a communication system.

An embodiment of the present disclosure proposes an apparatus and method for automatically registering a fixed device at a server according to the installation of the fixed device in a communication system.

An embodiment of the present disclosure proposes an apparatus and method for estimating the location of mobile device based on location information of a fixed device in a communication system.

An embodiment of the present disclosure proposes an apparatus and method for effectively replacing a management device which manages fixed devices in a communication system.

According to an embodiment of the present disclosure, an operating method of a mobile device is proposed, and the operating method comprises detecting a registration event for registering, at a server, location information of a fixed device to be installed, and transmitting, to the fixed device, identification information and location information of the mobile device in response to the detection of the registration event.

According to an embodiment of the present disclosure, an operating method of a mobile device is proposed, and the operating method comprises transmitting location information of the mobile device to a server, detecting a registration event for registering, at the server, location information of a fixed device to be installed, and transmitting, to the fixed device, identification information of the mobile device in response to the detection of the registration event.

According to an embodiment of the present disclosure, a method of registering a location is proposed, and the method comprises receiving, by a server from a fixed device, data related to an operation of the fixed device, estimating, by the server, location information of the fixed device based on the data, displaying and registering, by the server, the estimated location information of the fixed device, transmitting, by the server, to at least one of the mobile device and the fixed device, information indicating that the location information of the fixed device has been registered at the server, and displaying, by the at least one of the mobile device and the fixed device, the information indicating that the location information of the fixed device has been registered at the server.

According to an embodiment of the present disclosure, a method of registering a location is proposed, and the method comprises receiving, by a server from a mobile device, location information of the mobile device, receiving, by the server from a fixed device, data related to an operation of the fixed device, estimating, by the server, identification information of the mobile device based on the data, displaying and registering, by the server, the location information of the mobile device which corresponds to a time point at which the identification information of the mobile device is received as location information of the fixed device, transmitting, by the server, to at least one of the mobile device related to the fixed device and the fixed device, information indicating that the location information of the fixed device has been registered at the server, and displaying, by the at least one of the mobile device and the fixed device, the information indicating that the location information of the fixed device has been registered at the server.

According to an embodiment of the present disclosure, an operating method of a device in a communication system is proposed, and the operating method comprises transmitting, to other device, at least one of a device identifier (ID) of the device and location information of the device, and the at least one of the device ID of the device and the location information of the device is registered at a server connected to the other device, and the device ID and the location information are generated based on operation commands for the other device.

According to an embodiment of the present disclosure, an operating method of a server is proposed, and the operating method comprises receiving, from a first device, operation status information indicating the operation status of the first device, obtaining at least one of a device identifier (ID) of a second device and location information of the second device, based on the operation status information, and estimating the location of the first device based on at least one of the device ID of the second device and the location information of the second device.

According to an embodiment of the present disclosure, a mobile device is proposed, and the mobile device comprises a processor configured to detect a registration event for registering, at a server, location information of a fixed device to be installed, and a transmitter configured to transmit, to the fixed device, identification information and location information of the mobile device in response to the detection of the registration event.

According to an embodiment of the present disclosure, a mobile device is proposed, and the mobile device comprises a processor configured to detect a registration event for registering, at a server, location information of a fixed device to be installed, and a transmitter configured to transmit, to the server, location information of the mobile device, and to transmit, to the fixed device, identification information of the mobile device in response to the detection of the registration event.

According to an embodiment of the present disclosure, a system is proposed, and the system comprises a server, a fixed device, and a mobile device, the server comprises a receiver configured to receive, from the fixed device, data related to an operation of the fixed device, a processor configured to estimate location information of the fixed device based on the data and to display and register the estimated location information of the fixed device, and a transmitter configured to transmit, to at least one of the mobile device and the fixed device, information indicating that the location information of the fixed device has been registered at the server, and the at least one of the mobile device and the fixed device includes a processor configured to display the information indicating that the location information of the fixed device has been registered at the server.

According to an embodiment of the present disclosure, a system is proposed, and the system comprises a server, a fixed device, and a mobile device, the server comprises a receiver configured to receive, from the mobile device, location information of the mobile device, and to receive, from the fixed device, data related to an operation of the fixed device, a processor configured to estimate identification information of the mobile device based on the data, and to display and register the location information of the mobile device which corresponds to a time point at which the identification information of the mobile device is received as location information of the fixed device, and a transmitter configured to transmit, to at least one of the mobile device related to the fixed device and the fixed device, information indicating that the location information of the fixed device has been registered at the server, and the at least one of the mobile device and the fixed device includes a processor configured to display the information indicating that the location information of the fixed device has been registered at the server.

According to an embodiment of the present disclosure, a device in a communication system is proposed, and the device comprises a transmitter configured to transmit, to other device, at least one of a device identifier (ID) of the device and location information of the device, and the at least one of the device ID of the device and the location information of the device is registered at a server connected to the other device, and the device ID and the location information are generated based on operation commands for the other device.

According to an embodiment of the present disclosure, a server in a communication system is proposed, and the server comprises a receiver configured to receive, from a first device, operation status information indicating the operation status of the first device, and a controller configured to obtain at least one of a device identifier (ID) of a second device and location information of the second device, based on the operation status information, and to estimate the location of the first device based on at least one of the device ID of the second device and the location information of the second device.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

An embodiment of the present disclosure enables to estimate a location in a communication system.

An embodiment of the present disclosure enables to automatically register a fixed device at a server according to installation of the fixed device in a communication system.

An embodiment of the present disclosure enables to estimate the location of mobile device based on location information of a fixed device in a communication system.

An embodiment of the present disclosure enables to effectively replace a management device which manages fixed devices in a communication system.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
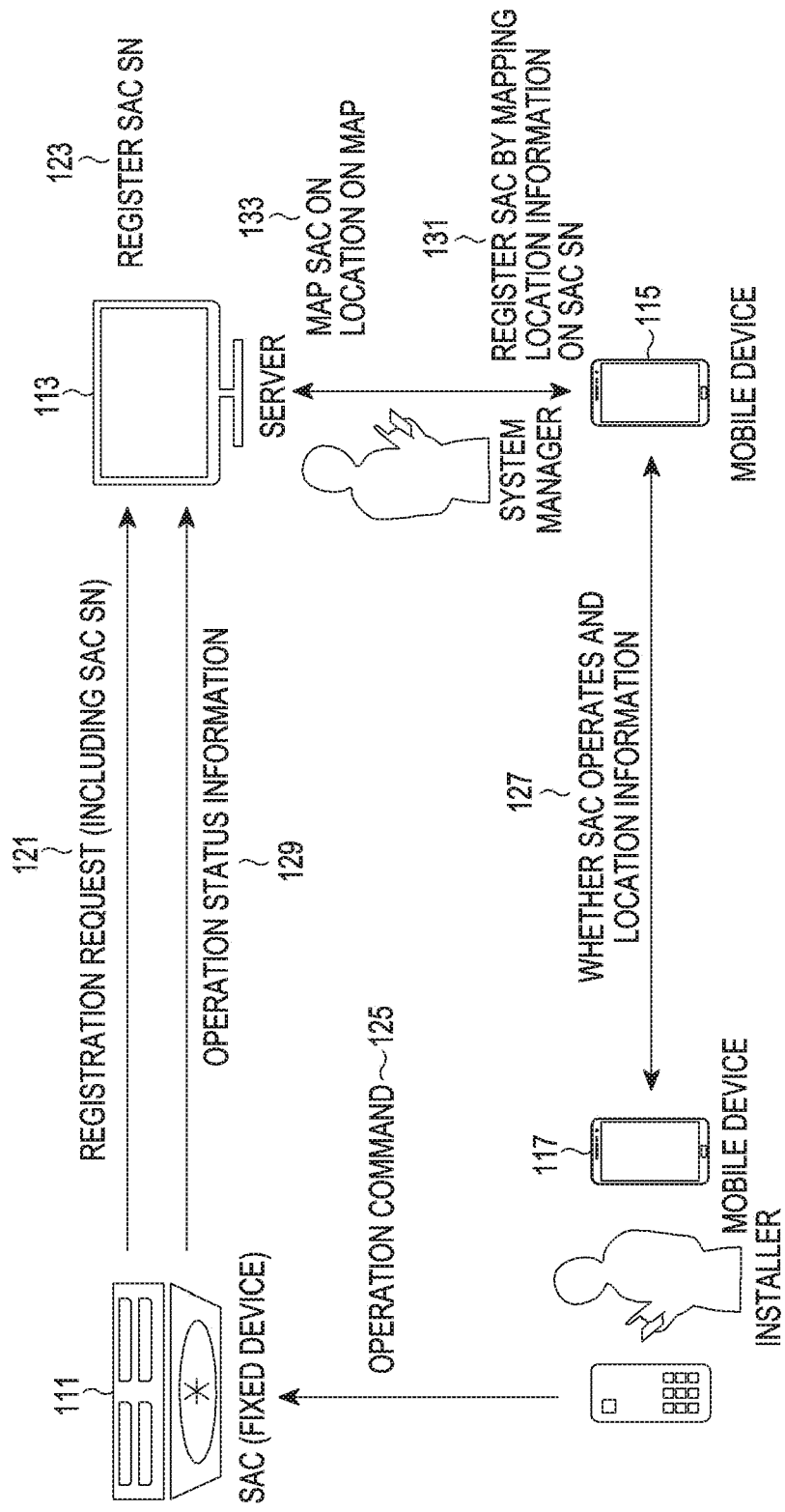
FIG. 1 schematically illustrates a process of registering an SAC in a general SAC system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes an apparatus and method for estimating a location in a communication system.

An embodiment of the present disclosure proposes an apparatus and method for automatically registering a fixed device at a server according to installation of the fixed device in a communication system.

An embodiment of the present disclosure proposes an apparatus and method for estimating the location of mobile device based on location information of a fixed device in a communication system.

An embodiment of the present disclosure proposes an apparatus and method for effectively replacing a management device which manages fixed devices in a communication system.

In various embodiments of the present disclosure, for convenience, it will be assumed that a communication system is, for example, a system air-conditioner (SAC) system. However, various embodiments of the present disclosure may be applied to all communication systems which are implemented as a form with at least one fixed device installed at a fixed location and a server as well as the SAC system. Further, various embodiments of the present disclosure may be applied to all communication systems which are implemented as a form with at least one fixed device installed at a fixed location, a management device connected between the at least one fixed device and a server, and the server as well as the SAC system.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

A process of registering an SAC in an SAC system according to an embodiment of the present disclosure will be described with reference to FIG. 2.

Figure 2:
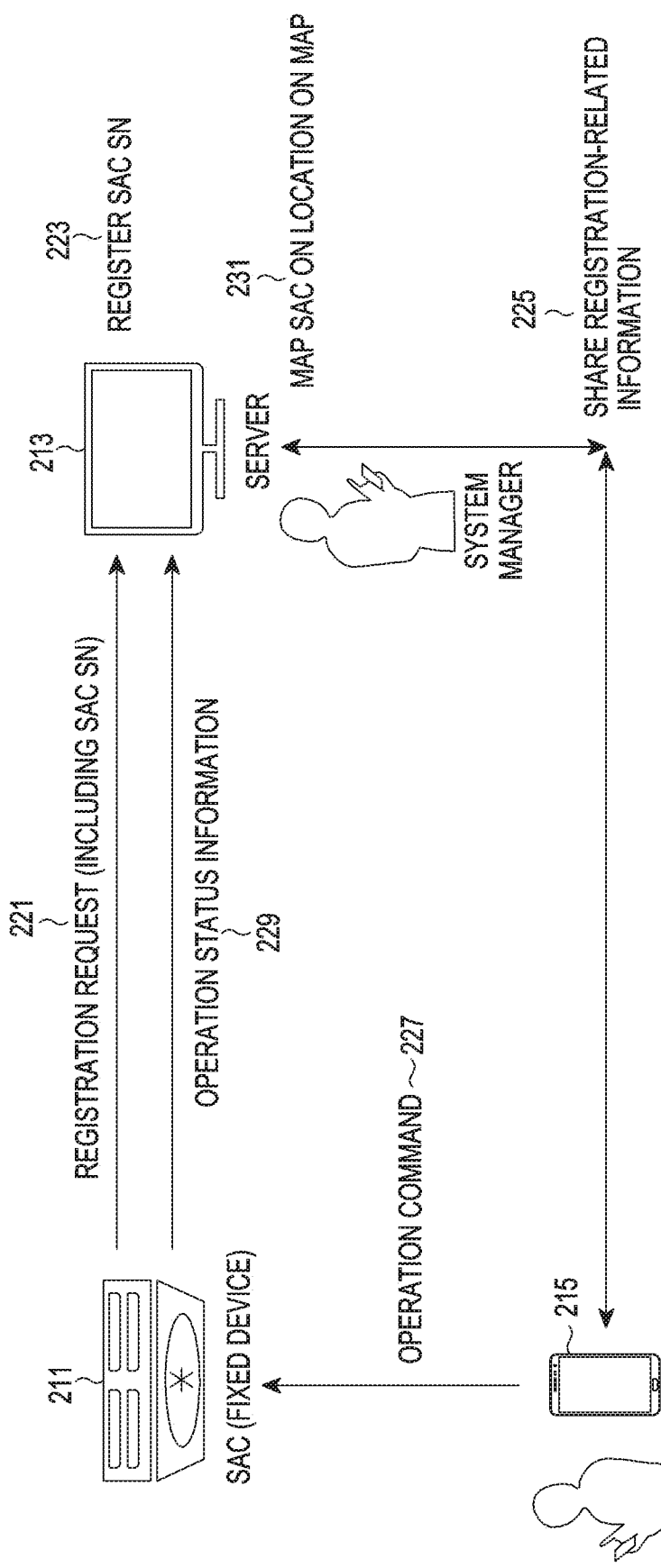
FIG. 2 schematically illustrates a process of registering an SAC in an SAC system according to an embodiment of the present disclosure.

FIG. 2 schematically illustrates a process of registering an SAC in an SAC system according to an embodiment of the present disclosure.

Referring to FIG. 2, an SAC system includes an SAC 211, a server 213, and a mobile device 215. In an embodiment of the present disclosure, an SAC denotes, for example, a set of one outdoor unit and one or more indoor units. The SAC 211 is a fixed device which is installed at a fixed location. In an embodiment of the present disclosure, the SAC system may include one or more SACs.

The mobile device 215 denotes a mobile device of an installer who installs the SAC 211.

When the SAC 211 is installed, the SAC 211 transmits, to the server 213, an SAC serial number (SN) as a kind of device identifier (ID) (at operation 221). Upon receiving the SAC SN from the SAC 211, the server 213 registers the SAC SN (at operation 223). The server 213 registers the received SAC SN in a device list, and the device list includes information about devices connected to the server 213.

Meanwhile, it will be assumed that the server 213 and the mobile device 215 mutually share registration related-information (at operation 225). The registration related-information may include a mobile device ID of a mobile device of an installer, location information of the mobile device, and/or the like. In an embodiment of the present disclosure, the mobile device ID and the location information of the mobile device may be implemented as an operation command sequence which is based on operation commands for an SAC, a code, combination of the operation command sequence and the code, and/or the like. The operation command sequence, which is based on the operation commands for the SAC, the code, the combination of the operation command sequence and the code, and/or the like, may also be included in the registration related-information. The registration related-information will be described below, so a detailed description will be omitted herein.

When the SAC 211 is installed, the mobile device 215 transmits operation commands for the SAC 211 (at operation 227). The operation commands are transmitted for registering the SAC 211 at the server 213, and the operation commands are mapped to the registration related-information. The registration related-information will be described below, so a detailed description will be omitted herein.

Upon receiving the operation commands from the mobile device 215, the SAC 211 transmits, to the server 213, operation status information indicating the operation status which corresponds to the received operation commands (at operation 229). For example, if an operation command indicates "power on", the SAC 211 transmits, to the server 213, operation status information indicating the power-on status as the operation status which corresponds to the operation command "power on" (at operation 229). The operation status information is transmitted along with an SAC SN of the SAC 211.

Upon receiving the operation status information from the SAC 211, the server 213 obtains registration related-information which corresponds to the received operation status information, and performs a registration operation for the SAC 211 corresponding to the obtained registration related-information. The server 213 maps the location of the SAC 211 on a map which the server 213 manages based on location information of the registered SAC 211 (at operation 231).

As described in FIG. 2, it is possible to automatically register an SAC at a server corresponding to registration related-information in a communication system according to an embodiment of the present disclosure.

So, if an SAC automatic-registration process according to an embodiment of the present disclosure is used, it is possible to automatically register an SAC at a server without modifying an existing SAC system, so the manpower, time, and cost that have occurred according to that the SAC are manually registered at the server.

If an SAC automatic-registration process according to an embodiment of the present disclosure is used, a plurality of installers may proceed to an installation operation for an SAC at the same time, so the time required for SAC installation may be decreased.

A process of registering an SAC in an SAC system according to an embodiment of the present disclosure has been described with reference to FIG. 2, and an example of a process of registering an SAC in an SAC system according to an embodiment of the present disclosure will be described with reference to FIG. 3.

Figure 3:
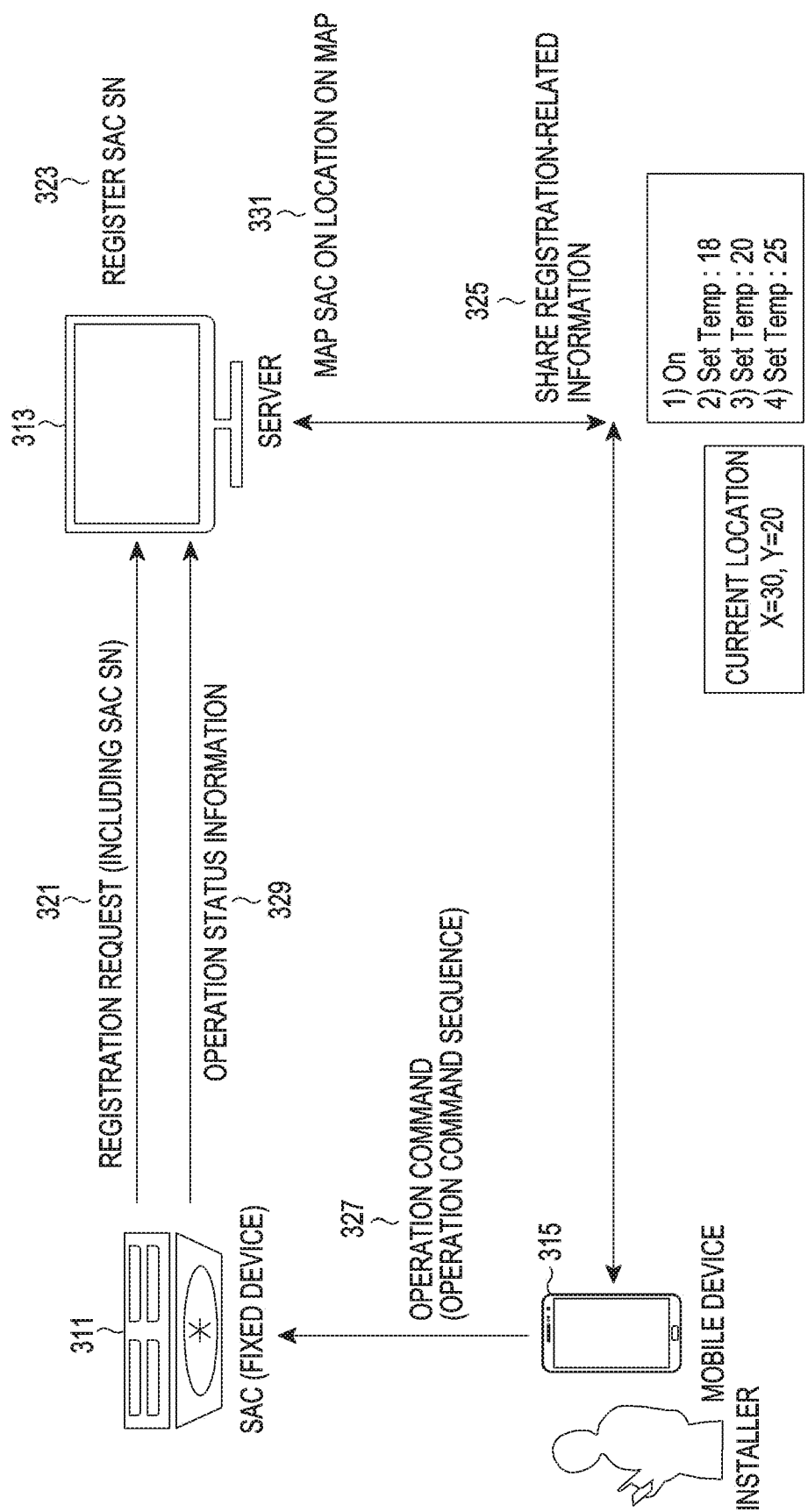
FIG. 3 schematically illustrates an example of a process of registering an SAC in an SAC system according to an embodiment of the present disclosure.

FIG. 3 schematically illustrates an example of a process of registering an SAC in an SAC system according to an embodiment of the present disclosure.

Referring to FIG. 3, it will be noted that a process of registering an SAC in FIG. 3 is a process of registering an SAC in a case in which a mobile device ID of a mobile device is implemented with an operation command sequence including operation commands for the SAC, and the location of the mobile device is mapped to the mobile device ID of the mobile device and the location of the mobile device and stored in advance at a server. So, it will be assumed that the mobile device and the server know an operation command sequence which corresponds to the mobile device ID of the mobile device in advance, and the server knows location information of the mobile device in advance.

An SAC system includes an SAC 311, a server 313, and a mobile device 315. The SAC 311 is an SAC which is newly installed at the SAC system. The mobile device 315 denotes a mobile device of an installer who installs the SAC 311.

Operations 321 and 323 in FIG. 3 are identical to operations 221 and 223 as described in FIG. 2, so a detailed description will be omitted herein.

It will be assumed that the server 313 and the mobile device 315 mutually share registration-related information in advance (at operation 325). So, in FIG. 3, it will be assumed that the server 313 and the mobile device 315 know an operation command sequence which corresponds to a mobile device ID of the mobile device 315 in advance, and the server 313 knows location information of the mobile device 315 in advance. In FIG. 3, for example, it will be assumed that an operation command sequence indicating the mobile device ID of the mobile device 315 is "power on, set temperature: 18, set temperature: 20, set temperature: 22". If there is another device other than the mobile device 315, a mobile device ID of the other device may be implemented with, for example, an operation command sequence such as "power on, set temperature: 20, set temperature: 18, set temperature: 19". In FIG. 3, it will be assumed that the location information of the mobile device 315 is expressed with, for example, an (X,Y) coordinate with X=30 and Y=20.

If operation status information which corresponds to an operation command sequence including operation commands of an order such as "power on=> set temperature: 18=> set temperature: 20=> set temperature: 22" is from the SAC 311, the server 313 may detect that the operation status information is the mobile device ID of the mobile device 315, so the server may obtain location information of the SAC 311 from the location information of the mobile device 315. In an embodiment of the disclosure, it will be assumed that the location information of an SAC is identical to the location information of a mobile device of an installer.

After the SAC 311 is installed, the mobile device 315 transmits, to the SAC 311, operation commands which correspond to the operation command sequence mapped to the mobile device ID of the mobile device 315 for registering the SAC 311 at the server 313 (at operation 327). Upon receiving the operation commands from the mobile device 315, the SAC 311 transmits, to the server 313, operation status information indicating the operation status which corresponds to the received operation commands (at operation 329). The operation command sequence mapped to the mobile device ID of the mobile device 315 is "power on=> set temperature: 18=> set temperature: 20=> set temperature: 22", so the operation status information indicates the operation status which corresponds to this.

Upon receiving the operation status information from the SAC 311, the server 313 obtains an operation command sequence which corresponds to the received operation status information, and obtains a mobile device ID, i.e., the mobile device ID of the mobile device 315, which corresponds to the obtained operation command sequence. So, the server 313 determines the location information of the mobile device 315 as the location information of the SAC 311, and maps the location of the SAC 311 on a map which the server 313 manages based on the location information of the SAC 311 (at operation 331).

An example of process of registering an SAC in an SAC system according to an embodiment of the present disclosure has been described with reference to FIG. 3, and another example of a process of registering an SAC in an SAC system according to an embodiment of the present disclosure will be described with reference to FIG. 4.

Figure 4:
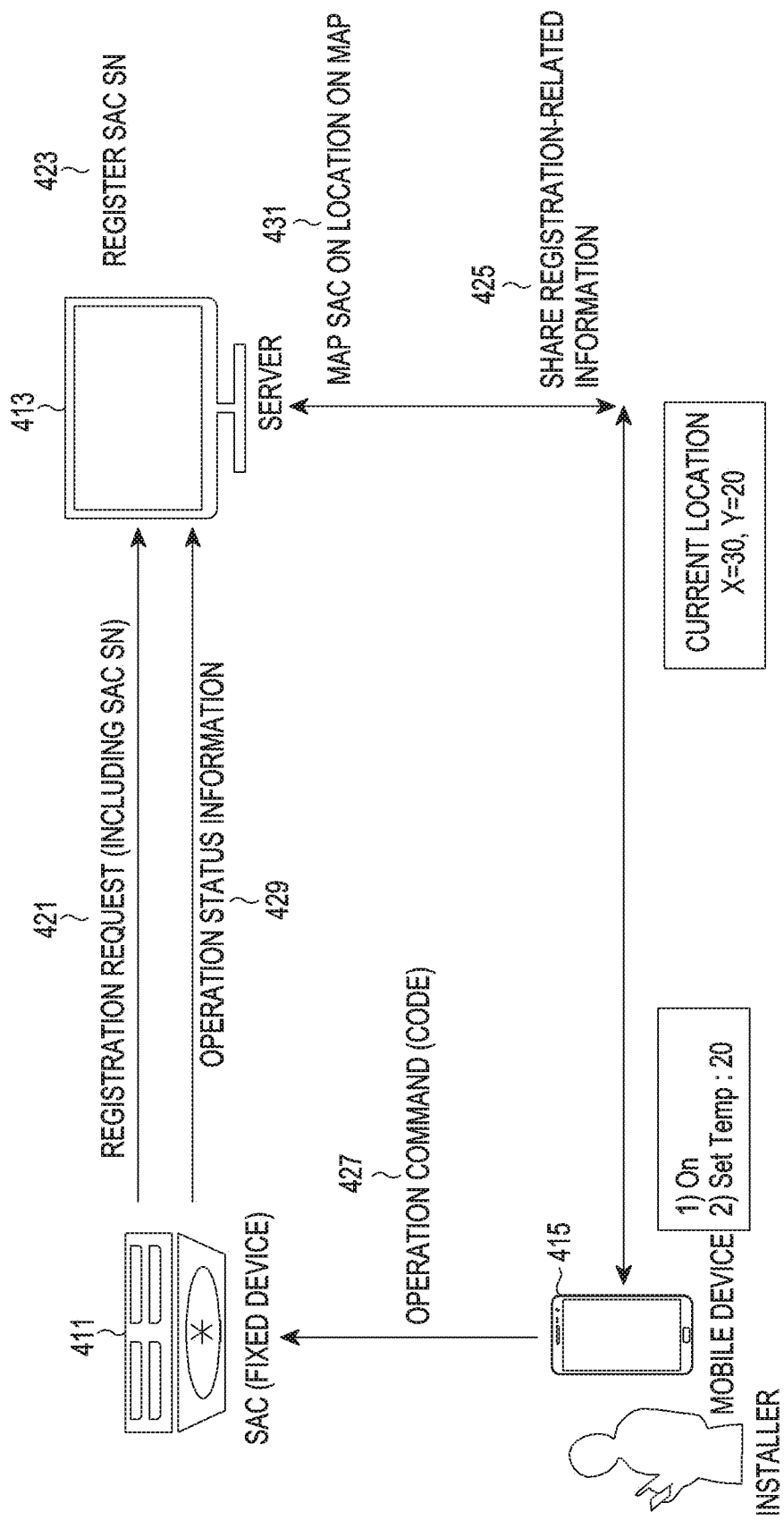
FIG. 4 schematically illustrates another example of a process of registering an SAC in an SAC system according to an embodiment of the present disclosure.

FIG. 4 schematically illustrates another example of a process of registering an SAC in an SAC system according to an embodiment of the present disclosure.

Referring to FIG. 4, it will be noted that a process of registering an SAC in FIG. 4 is a process of registering an SAC in a case in which each of operation commands for the SAC is mapped to a code, and a mobile device ID of a mobile device and the location of the mobile device are stored in advance at a server. The code may include a character, a digit, a special character, and/or the like. So, it will be assumed that the mobile device and the server know a code which corresponds to each of the operation commands for the SAC in advance, and the server knows location information of the mobile device in advance.

For example, the code which corresponds to each of the operation commands for the SAC may be expressed as shown in Table 1.

TABLE 1

| 18 degrees | 1 | 19 degrees | 2 | 20 degrees | 3 | 21 degrees | 4 | 22 degrees | 5 |
|---|---|---|---|---|---|---|---|---|---|
| 23 degrees | 6 | 24 degrees | 7 | 25 degrees | 8 | 26 degrees | 9 | 27 degrees | 0 |
| Mild Wind | A | Weak Wind | B | Medium Wind | C | Strong Wind | D | Turbo | E |
| Rotation | F | ... | ... | ... | ... | ... | ... | ... | ... |

As shown in Table 1, an operation command for setting the temperature to 18 degrees may express a code "1", and an operation command for setting the temperature to 19 degrees may express a code "2". In this way, a unique code may be mapped to each of the operation commands.

In FIG. 4, it will be assumed that the location information of the mobile device 415 is expressed with, for example, an (X,Y) coordinate with X=30 and Y=20.

An SAC system includes an SAC 411, a server 413, and a mobile device 415. The SAC 411 is an SAC which is newly installed at the SAC system. The mobile device 415 denotes a mobile device of an installer who installs the SAC 411.

Operations 421 and 423 in FIG. 4 are identical to operations 221 and 223 as described in FIG. 2, so a detailed description will be omitted herein.

It will be assumed that the server 413 and the mobile device 415 mutually share registration-related information in advance (at operation 425). So, in FIG. 4, each of the server 413 and the mobile device 415 knows a code which corresponds to each of operation commands for an SAC in advance. Further, it will be assumed that the server 413 knows a mobile device ID of the mobile device 415 and location information of the mobile device 415 in advance. In FIG. 4, for example, it will be assumed that the mobile device ID of the mobile device 415 is "3".

After the SAC 411 is installed, the mobile device 415 transmits, to the SAC 411, a power-on command and an operation command, i.e., "set temperature: 20", mapped to the mobile device ID of the mobile device 415 for registering the SAC 411 at the server 413 (at operation 427). Upon receiving the operation commands from the mobile device 415, the SAC 411 transmits, to the server 413, operation status information indicating the operation status which corresponds to the received operation commands (at operation 429). The operation commands received from the mobile device 415 are "power on" and "set temperature: 20", so the operation status information indicates the operation status which corresponds to this.

Upon receiving the operation status information from the SAC 411, the server 413 obtains operation commands which correspond to the received operation status information, and obtains a mobile device ID, i.e., the mobile device ID of the mobile device 415, which corresponds to the obtained operation commands. So, the server 413 determines the location information of the mobile device 415 as the location information of the SAC 411, and maps the location of the SAC 411 on a map which the server 413 manages based on the location information of the SAC 411 (at operation 431).

Another example of process of registering an SAC in an SAC system according to an embodiment of the present disclosure has been described with reference to FIG. 4, and yet another example of a process of registering an SAC in an SAC system according to an embodiment of the present disclosure will be described with reference to FIG. 5.

Figure 5:
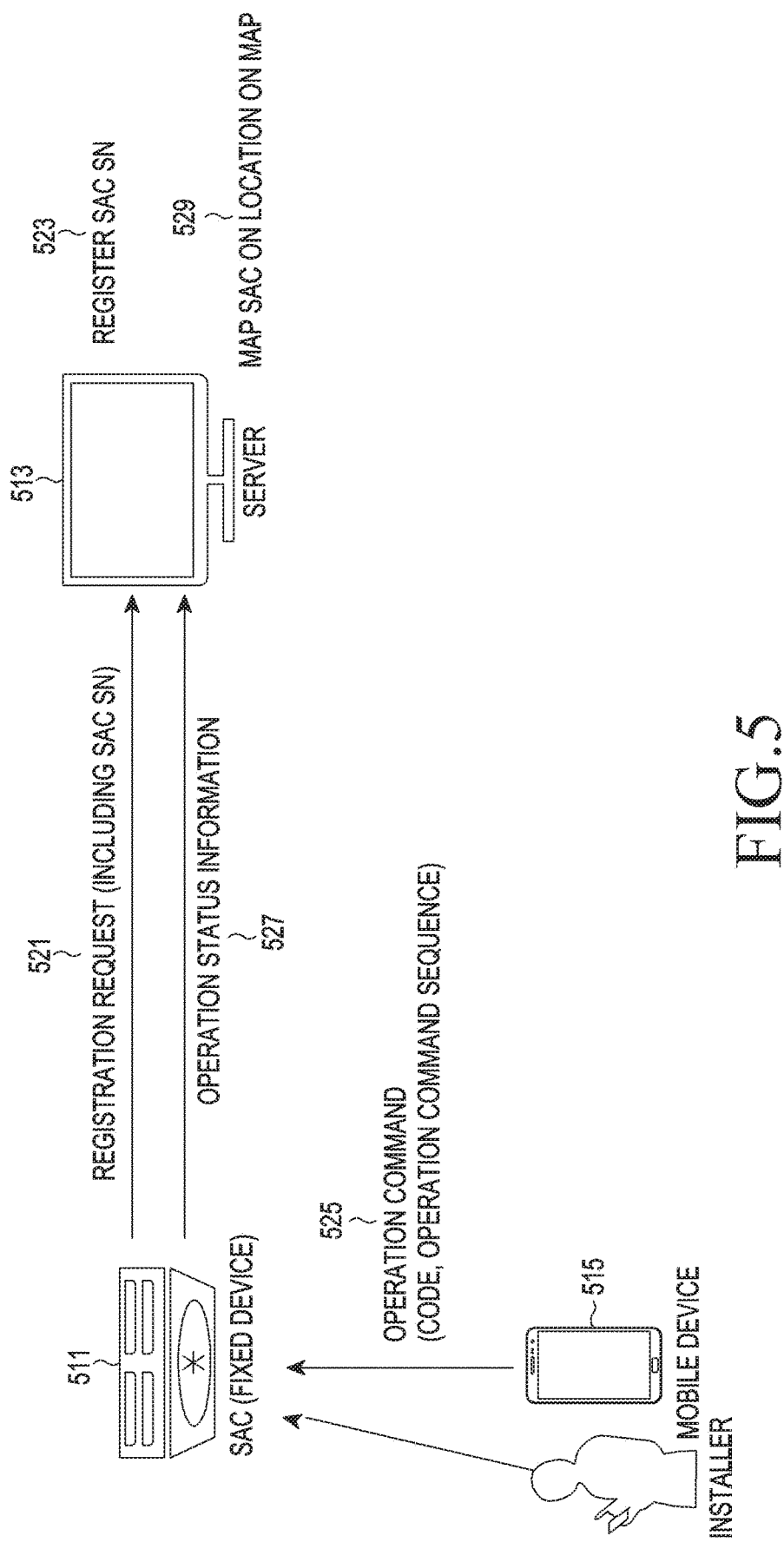
FIG. 5 schematically illustrates still another example of a process of registering an SAC in an SAC system according to an embodiment of the present disclosure.

FIG. 5 schematically illustrates yet another example of a process of registering an SAC in an SAC system according to an embodiment of the present disclosure.

Referring to FIG. 5, it will be noted that a process of registering an SAC in FIG. 5 is a process of registering an SAC in a case in which each of operation commands for the SAC is mapped to a code, the first part included in an operation command sequence is mapped to a mobile device ID of a mobile device, the second part included in the operation command sequence is mapped to an X-coordinate of location information of the mobile device, and the third part included in the operation command sequence is mapped to a Y-coordinate of the location information of the mobile device. The code may include a character, a digit, a special character, and/or the like. So, it will be assumed that the mobile device and the server know a code which corresponds to each of the operation commands for the SAC in advance. For example, a code which corresponds to each of the operation commands for the SAC may be expressed as shown in Table 1, so a detailed description thereof will be omitted herein. In an embodiment of the present disclosure, an operation command sequence includes three parts; however, the operation command sequence may include four or more parts, and an additional part may be used for another use.

In FIG. 5, it will be assumed that a mobile device ID of a mobile device 515 is "03", and location information of the mobile device 515 is expressed with an (X,Y) coordinate with X=058 and Y=012. So, an operation command sequence indicating the mobile device ID and the location information of the mobile device 515 may be expressed as shown in Table 2.

TABLE 2

| | Sequence | | | | | | | | |
|---|---|---|---|---|---|---|---|---|---|
| | 0 | 1 | 2 | 3 | 4 | 5 | 6 | 7 | 8 |
| Data | ON | Set 27 | Set 20 | Set 27 | Set 22 | Set 25 | Set 27 | Set 18 | Set 19 |
| Meaning | — | Installer ID: 03 | | X-Coordinate: 058 | | | Y-Coordinate: 012 | | |

An SAC system includes an SAC 511, a server 513, and a mobile device 515. The SAC 511 is an SAC which is newly installed at the SAC system. The mobile device 515 denotes a mobile device of an installer who installs the SAC 511.

Operations 521 and 523 in FIG. 5 are identical to operations 221 and 223 as described in FIG. 2, so a detailed description will be omitted herein.

It will be assumed that the server 513 and the mobile device 515 mutually share registration-related information in advance. So, in FIG. 5, each of the server 513 and the mobile device 515 knows a code which corresponds to each of operation commands for an SAC and an operation command sequence in advance. In FIG. 5, the mobile device 515 directly transmits, to the server 513, a mobile device ID and location information of the mobile device 515 through the SAC 511, so the server 513 does not need to know the mobile device ID and the location information of the mobile device 515 in advance.

After the SAC 511 is installed, in order to register the SAC 511 at the server 513, the mobile device 515 transmits, to the SAC 511, a power-on command and an operation command, i.e., "set temperature: 27, set temperature: 20", which is mapped to the mobile device ID "03" of the mobile device 515 for transmitting the mobile device ID "03". Further, in order to register the SAC 511 at the server 513, the mobile device 515 transmits, to the SAC 511, an operation command, i.e., "set temperature: 27, set temperature: 22, set temperature: 25, set temperature: 27, set temperature: 18, set temperature: 19", which is mapped to the location information of the mobile device 515 for transmitting the location information of the mobile device 515, i.e., an (X,Y) coordinate with X=058 and Y=012 (at operation 525).

Upon receiving the operation commands from the mobile device 515, the SAC 511 transmits, to the server 513, operation status information indicating the operation status which corresponds to the received operation commands (at operation 527). The operation commands received from the mobile device 515 are "power on", "set temperature: 27, set temperature: 20", and "set temperature: 27, set temperature: 22, set temperature: 25, set temperature: 27, set temperature: 18, set temperature: 19", so the operation status information indicates the operation status which corresponds to this.

Upon receiving the operation status information from the SAC 511, the server 513 obtains operation commands which correspond to the received operation status information, and obtains a mobile device ID, i.e., the mobile device ID of the mobile device 515 and location information of the mobile device 515 corresponding to the obtained operation commands. So, the server 513 determines the location information of the mobile device 515 as the location information of the SAC 511, and maps the location of the SAC 511 on a map which the server 513 manages based on the location information of the SAC 511 (at operation 529).

A process of registering an SAC in an SAC system according to an embodiment of the present disclosure has been described with reference to FIGS. 2 to 5, and a process of estimating the location of a mobile device based on the location of an SAC in an SAC system according to an embodiment of the present disclosure will be described with reference to FIGS. 6 and 7.

Figure 6:
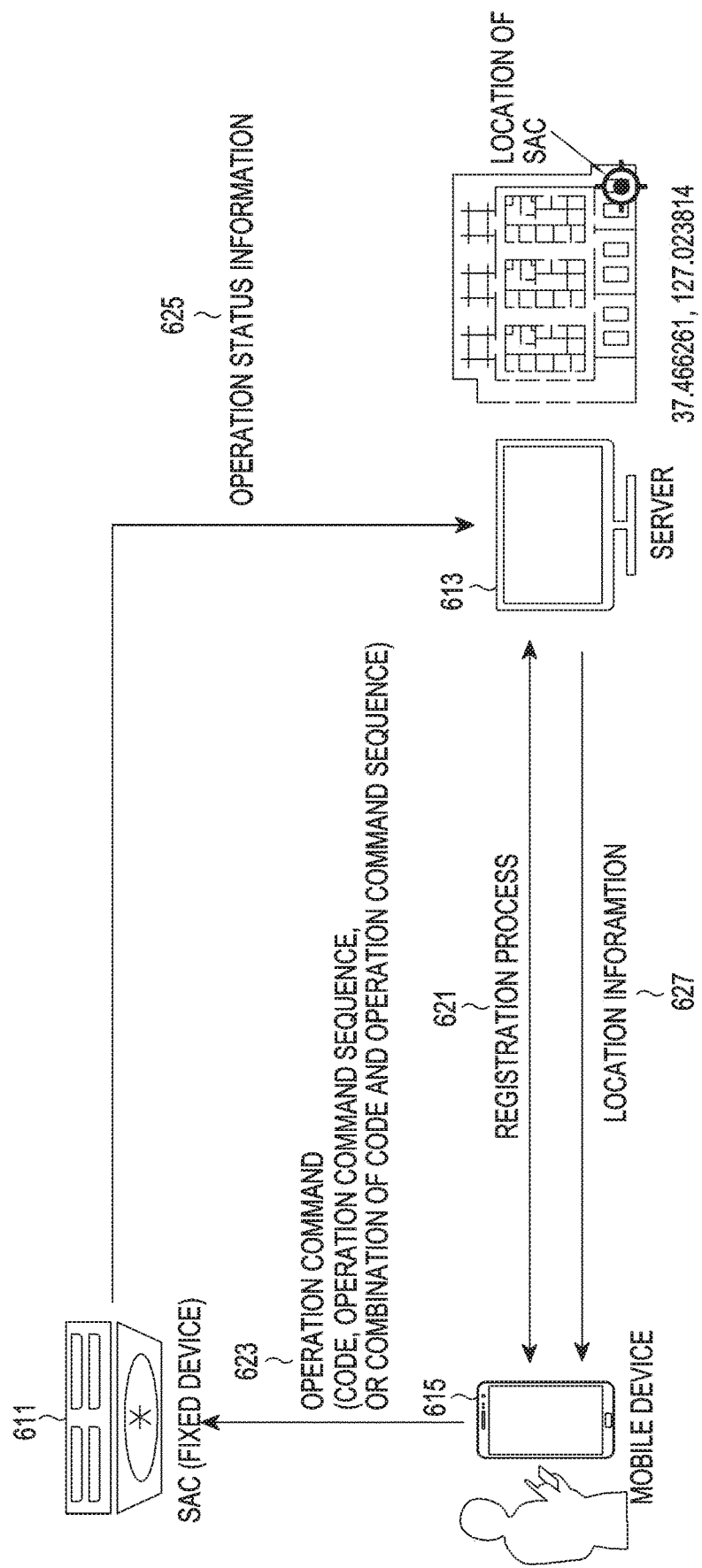
FIG. 6 schematically illustrates an example of a process of estimating a location of a mobile device based on a location of an SAC in an SAC system according to an embodiment of the present disclosure.

FIG. 6 schematically illustrates an example of a process of estimating the location of a mobile device based on the location of an SAC in an SAC system according to an embodiment of the present disclosure.

Referring to FIG. 6, it will be noted that a process of estimating the location of a mobile device based on the location of an SAC in FIG. 6 is a process of estimating the location of a mobile device based on the location of an SAC in a case in which location information of the SAC has been already registered at a server according to a process of registering the SAC as described in FIGS. 2 to 5.

An SAC system includes an SAC 611, a server 613, and a mobile device 615. The SAC 611 is an SAC which has been already registered at the SAC system. The mobile device 615 is a mobile device of a user who exists within a range within which it is possible for the mobile device 615 to communicat with the SAC 611.

If there is a need to register the mobile device 615 at the server 613, for example, if the mobile device 615 intends to obtain location information of the mobile device 615 through the SAC 611, the mobile device 615 performs a registration process with the server 613 (at operation 621). In the registration process, the server 613 allocates an ID to the mobile device 615, so the mobile device 615 may be identified based on the ID in the subsequent process. The ID may be an ID which the server 613 uniquely allocates to a mobile device which requests registration at the server 613, and the ID may be also implemented with an operation command sequence, a code which corresponds to each of operation commands, a combination of the operation command sequence and the code, and/or the like.

In FIG. 6, the server 613 registers the mobile device 615 upon receiving a registration request from the mobile device 615, allocates a mobile device ID to the mobile device 615, and transmits the allocated mobile device ID to the mobile device 615.

After a registration process between the server 613 and the mobile device 615 is completed, the mobile device 615 transmits, to the SAC 611, the mobile device ID allocated by the server 613 and operation commands which correspond to a location information-request command for requesting location information (at operation 623). The location information-request command may be also implemented with a code, an operation command sequence, a combination of the code and the operation command sequence, and/or the like. Upon receiving the operation commands from the mobile device 615, the SAC 611 transmits, to the server 613, operation status information indicating the operation status which corresponds to the received operation commands (at operation 625).

Upon receiving the operation status information from the SAC 611, the server 613 obtains operation commands which correspond to the received operation status information, and obtains the mobile device ID and the location information-request command of the mobile device 615 corresponding to the obtained operation commands. The server 613 detects location information of the SAC 611 according to the location information-request command to transmit the location information of the SAC 611 to the mobile device 615 (at operation 627).

As shown in FIG. 6, the location information of the SAC 611 has been registered with an (X,Y) coordinate with X=37.466261 and Y=127.023814, so the server 613 transmits, to the mobile device 615, the location information of the SAC 611, i.e., (37.466261, 127.023814).

An example of a process of estimating the location of a mobile device based on the location of an SAC in an SAC system according to an embodiment of the present disclosure has been described with reference to FIG. 6, and another example of a process of estimating the location of a mobile device based on the location of an SAC in an SAC system according to an embodiment of the present disclosure will be described with reference to FIG. 7.

Figure 7:
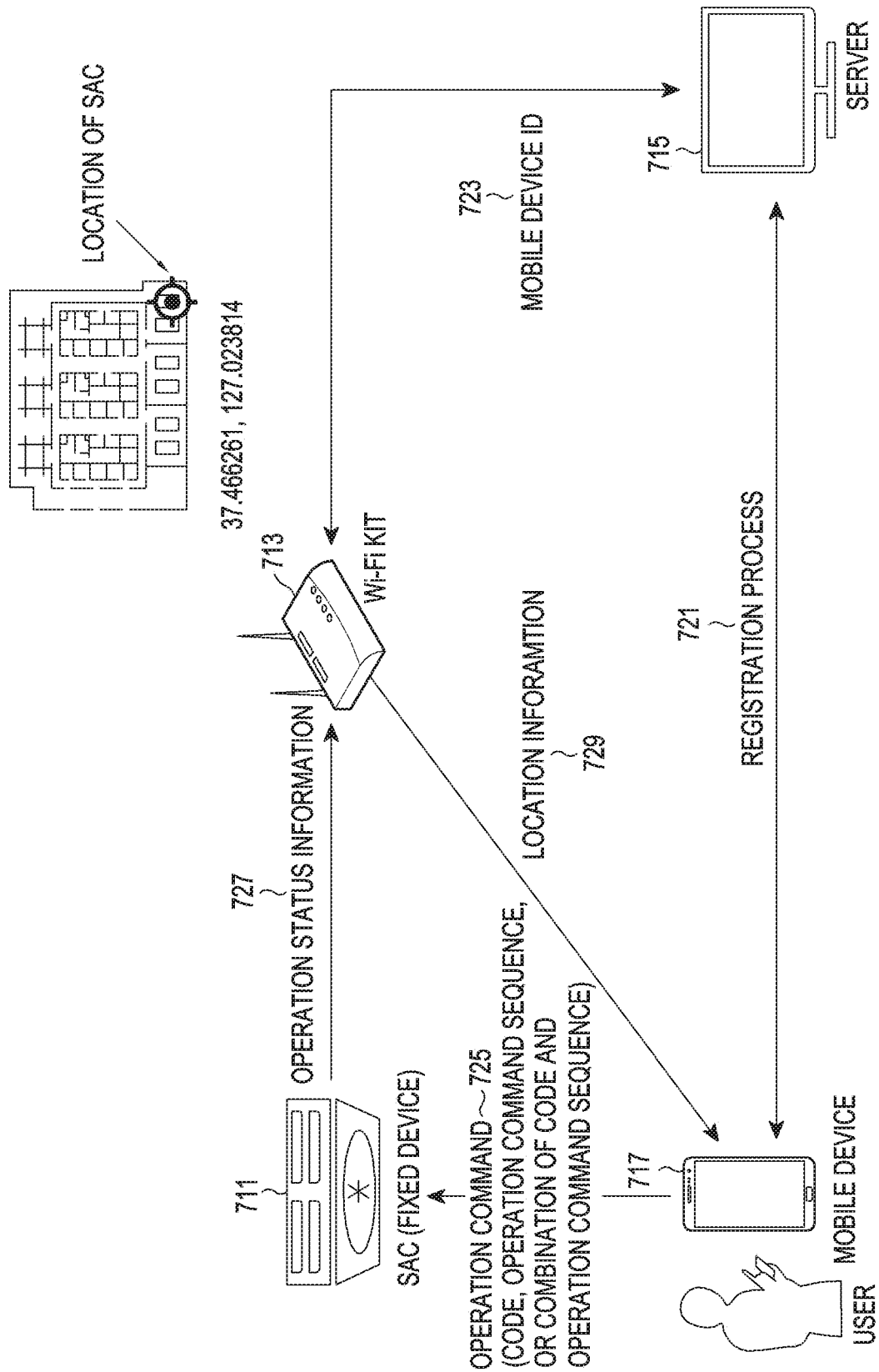
FIG. 7 schematically illustrates another example of a process of estimating a location of a mobile device based on a location of an SAC in an SAC system according to an embodiment of the present disclosure.

FIG. 7 schematically illustrates another example of a process of estimating the location of a mobile device based on the location of an SAC in an SAC system according to an embodiment of the present disclosure.

Referring to FIG. 7, it will be noted that a process of estimating the location of a mobile device based on the location of an SAC in FIG. 7 is a process of estimating the location of a mobile device based on the location of an SAC in a case in which location information of the SAC has been already registered at a Wi-Fi kit according to a process of registering the SAC as described in FIGS. 2 to 5.

As described in FIGS. 2 to 5, a process of registering an SAC according to installation of the SAC is performed in a server; however, the process of registering the SAC may be performed by a Wi-Fi kit, so a detailed description thereof will be omitted herein.

An SAC system includes an SAC 711, a Wi-Fi kit 713, a server 715, and a mobile device 717. The SAC 711 is an SAC which has been already registered at the SAC system. The mobile device 717 is a mobile device of a user who exists within a range within which the mobile device 715 is possible of communicating with the SAC 711. The Wi-Fi kit 713 is a device located between the SAC 711 and the server 715, and may be connected to a plurality of SACs. In FIG. 7, the server 715 does not register SACs included in the SAC system, but the Wi-Fi kit 713 registers the SACs included in the SAC system. There is no limitation on the number of Wi-Fi kits connected to the server 715.

If there is a need to register the mobile device 717 at the server 715, for example, if the mobile device 717 intends to obtain location information of the mobile device 717 through the SAC 711, the mobile device 717 performs a registration process with the server 715 (at operation 721). In the registration process, the server 715 allocates an ID to the mobile device 717, so the mobile device 717 may be identified based on the ID in the subsequent process. The ID may be an ID which the server 715 uniquely allocates to a mobile device which requests registration at the server 715, and the ID may be also implemented with an operation command sequence, a code which corresponds to each of operation commands, a combination of the operation command sequence and the code, and/or the like.

In FIG. 7, the server 715 registers the mobile device 717 upon receiving a registration request from the mobile device 717, allocates a mobile device ID to the mobile device 717, and transmits the allocated mobile device ID to the mobile device 717.

After a binding process between the server 715 and the mobile device 717 is completed, the server 715 transmits the mobile device ID of the mobile device 717 to the Wi-Fi kit 713 (at operation 723).

The mobile device 717 transmits, to the SAC 711, the mobile device ID allocated by the server 715 and operation commands which correspond to location information-request command for requesting location information (at operation 725). The location information-request command may be also implemented with a code, an operation command sequence, a combination of the code and the operation command sequence, and/or the like. Upon receiving the operation commands from the mobile device 717, the SAC 711 transmits, to the Wi-Fi kit 713, operation status information indicating the operation status which corresponds to the received operation commands (at operation 727).

Upon receiving the operation status information from the SAC 711, the Wi-Fi kit 713 obtains operation commands which correspond to the received operation status information, and obtains the mobile device ID and the location information-request command of the mobile device 717 corresponding to the obtained operation commands. The Wi-Fi kit 713 detects location information of the SAC 711 according to the location information-request command to transmit the location information of the SAC 711 to the mobile device 717 (at operation 729).

As shown in FIG. 7, the location information of the SAC 711 has been registered with an (X,Y) coordinate with X=37.466261 and Y=127.023814, so the Wi-Fi kit 713 transmits, to the mobile device 717, the location information of the SAC 711, i.e., (37.466261, 127.023814).

A process of estimating the location of a mobile device based on the location of an SAC in an SAC system according to an embodiment of the present disclosure has been described with reference to FIGS. 6 and 7, and a process of replacing a Wi-Fi kit in an SAC system according to an embodiment of the present disclosure will be described with reference to FIGS. 8 and 12.

Figure 8:
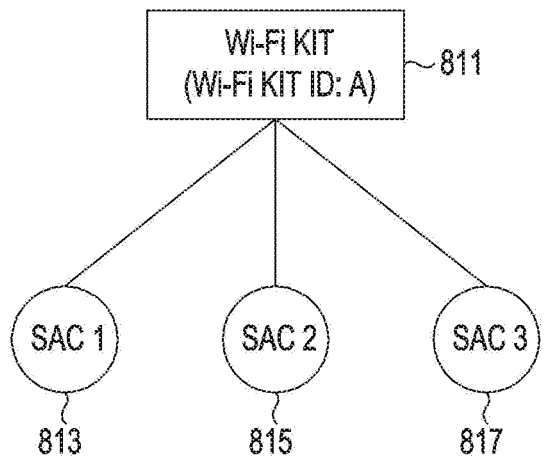
FIG. 8 schematically illustrates an example of a process in which a Wi-Fi kit operates in an SAC system according to an embodiment of the present disclosure.

FIG. 8 schematically illustrates an example of a process in which a Wi-Fi kit operates in an SAC system according to an embodiment of the present disclosure.

Referring to FIG. 8, a Wi-Fi kit 811 may be connected to at least one SAC, and it will be assumed that the Wi-Fi kit 811 is connected to three SACs, e.g., an SAC 1 813, an SAC 2 815, and an SAC 3 817 in FIG. 8. The Wi-Fi kit 811 has a unique ID, and each of the SAC 1 813, the SAC 2 815, and the SAC 3 817 does not have a unique ID, and has a serial number (SN) that is possible to be identified within only the Wi-Fi kit 811. Here, a unique ID allocated to a Wi-Fi kit will be referred to as "Wi-Fi kit ID".

Although not shown in FIG. 8, a server uses a combination of a Wi-Fi kit ID and an SAC SN as a unique ID which distinguishes SACs included in the SAC system for distinguishing the SACs. In FIG. 8, it will be assumed that a Wi-Fi kit ID of the Wi-Fi kit 811 is "A", and SAC SNs of the SAC 1 813, the SAC 2 815, and the SAC 3 817 are 1, 2, and 3, respectively. In this case, SAC IDs of the SAC 1 813, the SAC 2 815, and the SAC 3 817 may be A.1, A.2, and A.3, respectively.

So, the server may manage the history for the operation status and energy usage per SAC, and this may be expressed as shown in Table 3.

TABLE 3

| SAC ID | TIME | POWER AMOUNT | OPERATION MODE |
|---|---|---|---|
| A.1 | 10:00:00 | 10 KW | COMFORT OPERATION |
|  | 10:05:00 | 11 KW | COMFORT OPERATION |
| A.2 | 10:00:00 | 12 KW | COMFORT OPERATION |
|  | 10:05:00 | 13 KW | COMFORT OPERATION |
| A.3 | 10:00:00 | 11 KW | COMFORT OPERATION |
|  | 10:05:00 | 12 KW | COMFORT OPERATION |

Meanwhile, as described in FIG. 8, a situation in which a Wi-Fi kit needs to be replaced may occur while SACs are connected to the Wi-Fi kit and operate, and this will be described with reference to FIG. 9.

Figure 9:
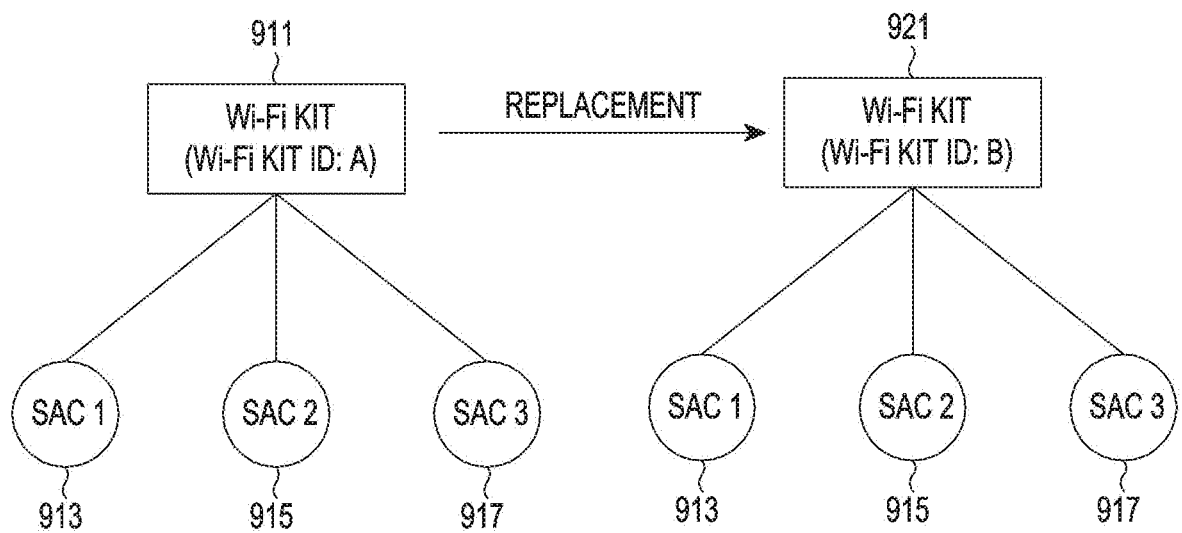
FIG. 9 schematically illustrates an example of a process of replacing a Wi-Fi kit in an SAC system according to an embodiment of the present disclosure.

FIG. 9 schematically illustrates an example of a process of replacing a Wi-Fi kit in an SAC system according to an embodiment of the present disclosure.

Referring to FIG. 9, it will be assumed that a Wi-Fi kit A 911 is connected to three SACs, e.g., an SAC 1 913, an SAC 2 915, and an SAC 3 917. In FIG. 9, it will be assumed that a Wi-Fi kit ID of the Wi-Fi kit A 911 is "A", and SAC SNs of the SAC 1 913, the SAC 2 915, and the SAC 3 917 are 1, 2, and 3, respectively.

A case in which the Wi-Fi kit A 911 is replaced with a Wi-Fi kit B 921 may occur while the Wi-Fi kit A 911 operates. In FIG. 9, it will be assumed that a Wi-Fi kit ID of the Wi-Fi kit B 921 is "B". Since a Wi-Fi kit is replaced from the Wi-Fi kit A 911 to the Wi-Fi kit B 921, the Wi-Fi kit B 921 performs a registration process with the server. After the Wi-Fi kit B 921 is registered at the server according to the registration process, it is impossible for the server to identify whether SACs connected to the Wi-Fi kit B 921, i.e., the SAC 1 913, the SAC 2 915, and the SAC 3 917 are SACs which have been already registered or new SACs.

So, the server recognizes the SACs which have been already registered, i.e., the SAC 1 913, the SAC 2 915, and the SAC 3 917 as new SACs of which SAC IDs are B.1, B.2., and B.3, respectively.

If a server recognizes SACs which have been already registered as new SACs as described above, it is impossible to manage the history for the operation status and energy usage for an SAC which is stored with an existing SAC ID, and this is expressed as shown in Table 4.

TABLE 4

| SAC ID | TIME | POWER AMOUNT | OPERATION MODE |
|---|---|---|---|
| A.1 | 10:00:00 | 10 KW | COMFORTABLE OPERATION |
|  | 10:05:00 | 11 KW | COMFORTABLE OPERATION |
| A.2 | 10:00:00 | 12 KW | COMFORTABLE OPERATION |
|  | 10:05:00 | 13 KW | COMFORTABLE OPERATION |
| A.3 | 10:00:00 | 11 KW | COMFORTABLE OPERATION |
|  | 10:05:00 | 12 KW | COMFORTABLE OPERATION |
| B.1 | 10:00:00 | NULL | NULL |
|  | 10:05:00 | NULL | NULL |
| B.2 | 10:00:00 | NULL | NULL |
|  | 10:05:00 | NULL | NULL |
| B.3 | 10:00:00 | NULL | NULL |
|  | 10:05:00 | NULL | NULL |

As shown in Table 4, the same SAC is recognized as a new SAC according to if a Wi-Fi kit is replaced, so a server may not maintain history information about the operation status and energy usage of an SAC which is stored with an existing SAC ID.

So, an embodiment of the present disclosure proposes a process of replacing a Wi-Fi kit in which it is possible to maintain history information about the operation status and energy usage of the same SAC even though a Wi-Fi kit is replaced in an SAC system.

An example of a process of replacing a Wi-Fi kit in an SAC system, according to an embodiment of the present disclosure, will be described with reference to FIG. 10.

Figure 10:
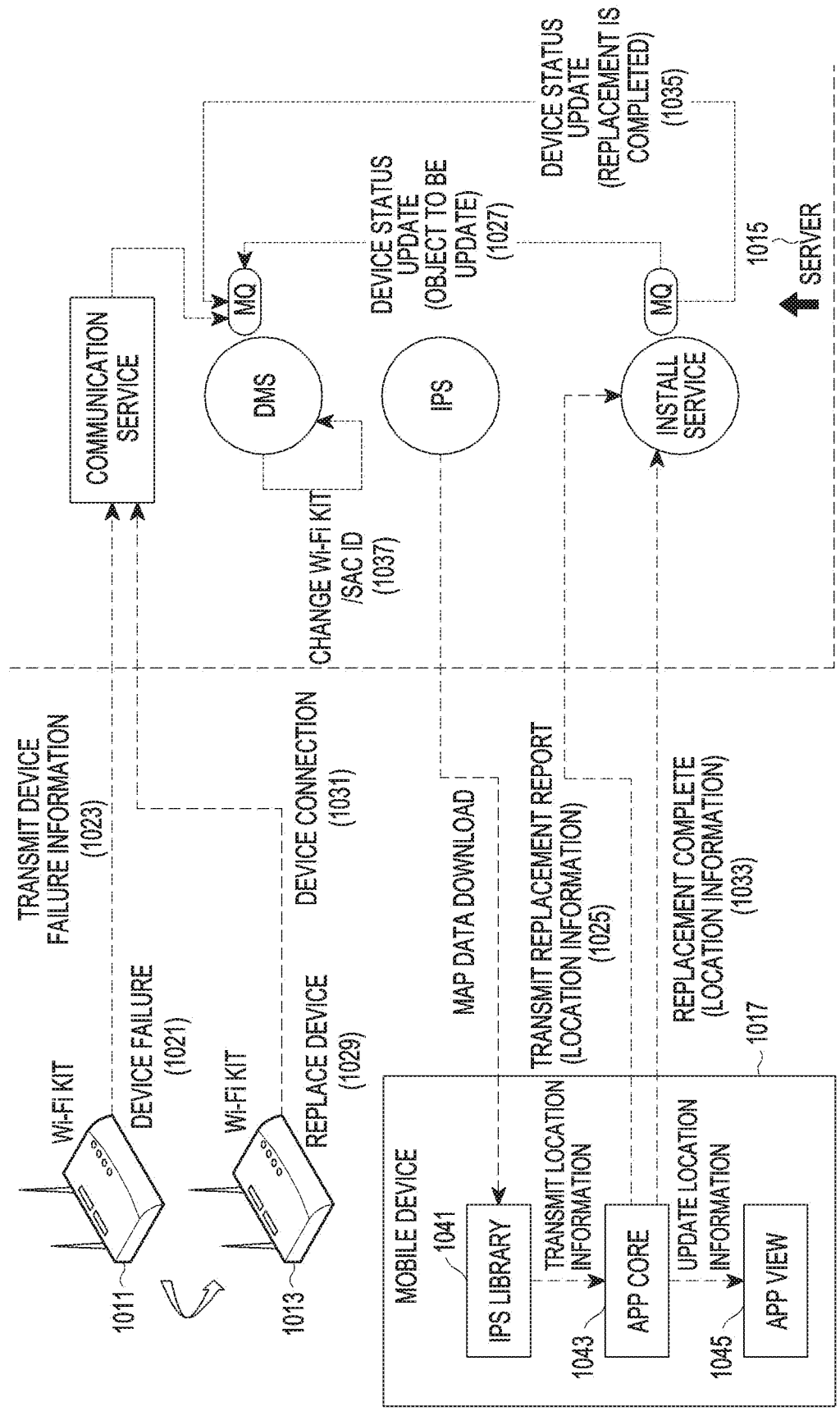
FIG. 10 schematically illustrates an example of a process of replacing a Wi-Fi kit in an SAC system according to an embodiment of the present disclosure.

FIG. 10 schematically illustrates an example of a process of replacing a Wi-Fi kit in an SAC system according to an embodiment of the present disclosure.

Referring to FIG. 10, it will be noted that a process of replacing a Wi-Fi kit in FIG. 10 is a process of replacing a Wi-Fi kit which is based on an indoor positioning system (IPS). In FIG. 10, it will be noted that the term Wi-Fi kit may be interchangeable with the term "device".

When a Wi-Fi kit 1011 detects device failure (at operation 1021), it transmits device failure information to a server 1015 (at operation 1023). Upon detecting the device failure, the Wi-Fi kit 1011 may determine that there is a need to replace a Wi-Fi kit. In an embodiment of the present disclosure, it will be assumed that a case of determining that there is a need to replace a Wi-Fi kit is, for example, a case of detecting device failure. Of course, the Wi-Fi kit 1011 determines that there is the need to replace the Wi-Fi kit due to various reasons in addition to the device failure. In an embodiment of the present disclosure, the Wi-Fi kit 1011 transmits the device failure information to the server 1015; however, the server 1015 may determine that there is a need to replace the Wi-Fi kit 1011.

After the Wi-Fi kit 1011 is replaced with the Wi-Fi kit 1013, a mobile device 1017 transmits a replacement report message to the server 1015 (at operation 1025). The replacement report message includes location information of the mobile device 1017. The replacement report message is transferred to an install service module within the server 1015, and the install service module transmits, to a device management service (DMS) module, a device status update message for requesting to update the device status (at operation 1027). Here, the device status indicates that it is an object to be replaced.

Meanwhile, after the Wi-Fi kit 1011 is replaced with the Wi-Fi kit 1013 (at operation 1029), the Wi-Fi kit 1013 transmits a device connection message to the server 1015 (at operation 1031). Upon detecting that replacement of a Wi-Fi kit is completed, the mobile device 1017 transmits a replacement complete message to the server 1015 (at operation 1033). Here, the replacement complete message includes the location information of the mobile device 1017.

Upon receiving the replacement complete message from the mobile device 1017, the install service module of the server 1015 transmits, to the DMS module, a device status update message for requesting to update device status (at operation 1035). Here, the device status indicates that replacement is completed.

Upon receiving the device status update message indicating that the replacement is completed, the DMS module changes a corresponding Wi-Fi kit ID and SAC ID (at operation 1037).

Meanwhile, a process of replacing a Wi-Fi kit in an SAC system according to an embodiment of the present disclosure in FIG. 10 will be described as follows.

First, when the Wi-Fi kit 1011 transmits device failure information (at operation 1023), the DMS module stores information indicating that the Wi-Fi kit 1011 failed. Upon receiving a replacement complete message 1033 including installation location information from the mobile device 1017, the install service module transmits a device status update command to the DMS module (at operation 1027). The DMS module performs an operation detecting the closest failed Wi-Fi kit, i.e., the Wi-Fi kit 1011, included in a radius which is set based on stored installation location, and changing existing subordinate SAC information to information of the newly installed Wi-Fi kit 1013 (at operation 1037).

An example of a process of replacing a Wi-Fi kit in an SAC system according to an embodiment of the present disclosure has been described with reference to FIG. 10, and another example of a process of replacing a Wi-Fi kit in an SAC system according to an embodiment of the present disclosure will be described with reference to FIG. 11.

Figure 11:
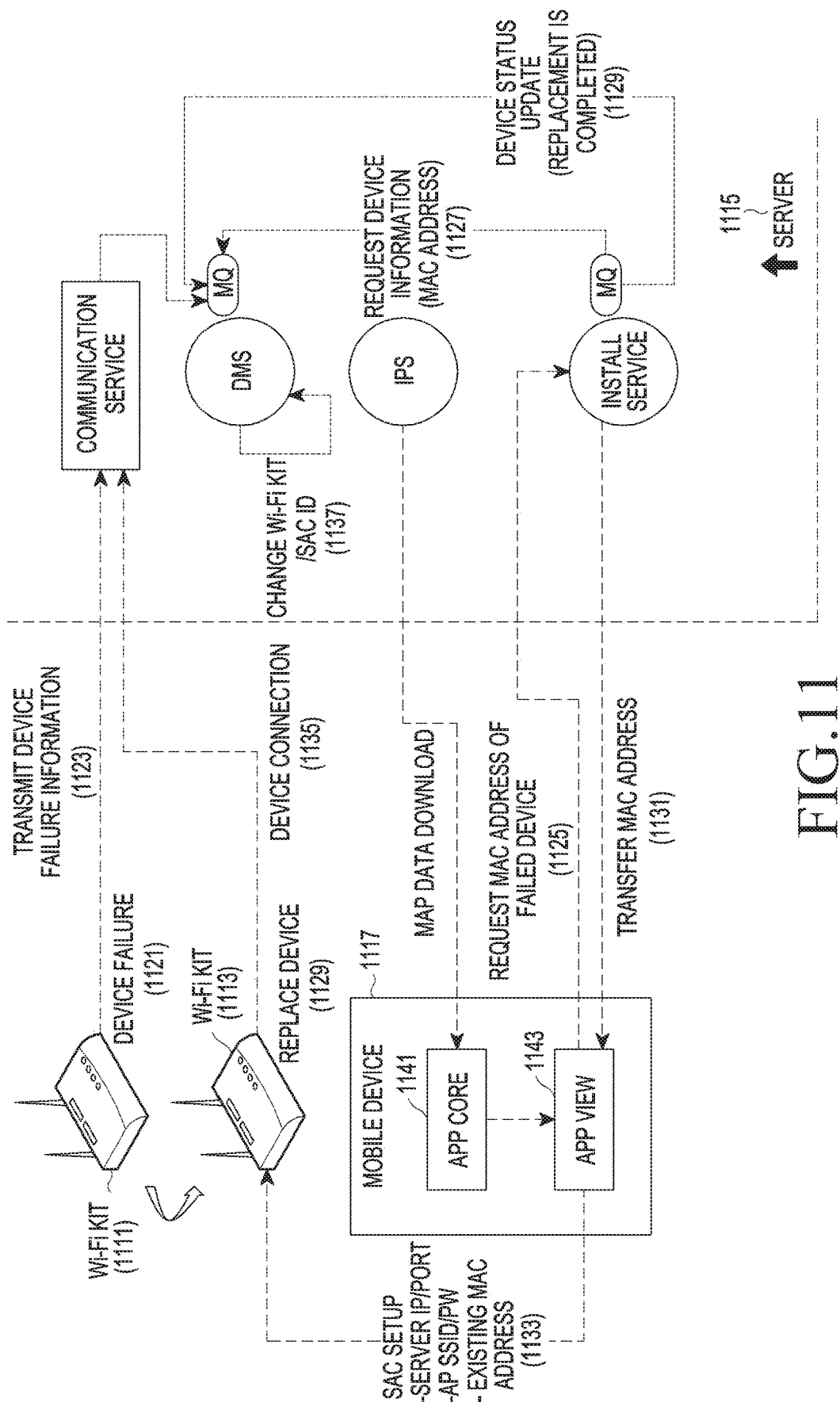
FIG. 11 schematically illustrates another example of a process of replacing a Wi-Fi kit in an SAC system according to an embodiment of the present disclosure.

FIG. 11 schematically illustrates another example of a process of replacing a Wi-Fi kit in an SAC system according to an embodiment of the present disclosure.

Referring to FIG. 11, it will be noted that a process of replacing a Wi-Fi kit in FIG. 11 is a process of replacing a Wi-Fi kit which is not based on an IPS.

Operations 1121 and 1123 in FIG. 11 are identical to operations 1021 and 1023 as described in FIG. 10, so a detailed description will be omitted herein.

Meanwhile, a Wi-Fi kit 1111 is replaced with a Wi-Fi kit 1113, so a mobile device 1117 transmits, to the server 1115, a failed device medium access control (MAC) address request message for requesting a MAC address of a failed device (at operation 1125).

The MAC address request message is transferred to an install service module within the server 1115, and the install service module transmits a device information request message for requesting the MAC address of the failed device, i.e., the Wi-Fi kit 1111 and a device status update message for requesting to update device status (at operation 1129). Here, the device status indicates that replacement is completed.

The install service module transfers, to the mobile device 1117, a MAC address of a failed device, i.e., the Wi-Fi kit 1111 (at operation 1131). The mobile device 1117 transmits an SAC setup message to the Wi-Fi kit 1113 (at operation 1133). The SAC setup message includes a server internet protocol (IP)/port of the server 1115, an AP SSID/PW, and an existing MAC address, i.e., a MAC address of the Wi-Fi kit 1111.

The Wi-Fi kit 1113 transmits a device connection message to the server 1115 (at operation 1135). Upon receiving the device connection message, the server 1115 changes a Wi-Fi kit ID and an SAC ID (at operation 1137).

Meanwhile, a process of replacing a Wi-Fi kit in an SAC system according to an embodiment of the present disclosure in FIG. 11 will be described as follows.

First, when the Wi-Fi kit 1111 transmits device failure information (at operation 1123), a DMS module stores information indicating that the Wi-Fi kit 1111 failed. After a MAC address of a failed device is received from a server (at operation 1131), the failed Wi-Fi kit 1111 is replaced (at operation 1129).

After the replacement is completed, MAC address information stored at the failed Wi-Fi kit 1111 is transmitted to the replaced Wi-Fi kit (at operation 1133). Upon being connected to a communication service, the new Wi-Fi kit 1113 transmits a MAC address of the failed Wi-Fi kit 1111 along with a new MAC address of the new Wi-Fi kit 1113, and the DMS module performs an operation of changing subordinate SAC information of the failed Wi-Fi kit 1111 to information of the newly installed Wi-Fi kit 1113 (at operation 1137).

Another example of a process of replacing a Wi-Fi kit in an SAC system according to an embodiment of the present disclosure has been described with reference to FIG. 11, and an operating process of a server in a process of replacing a Wi-Fi kit in an SAC system according to an embodiment of the present disclosure will be described with reference to FIG. 12.

Figure 12:
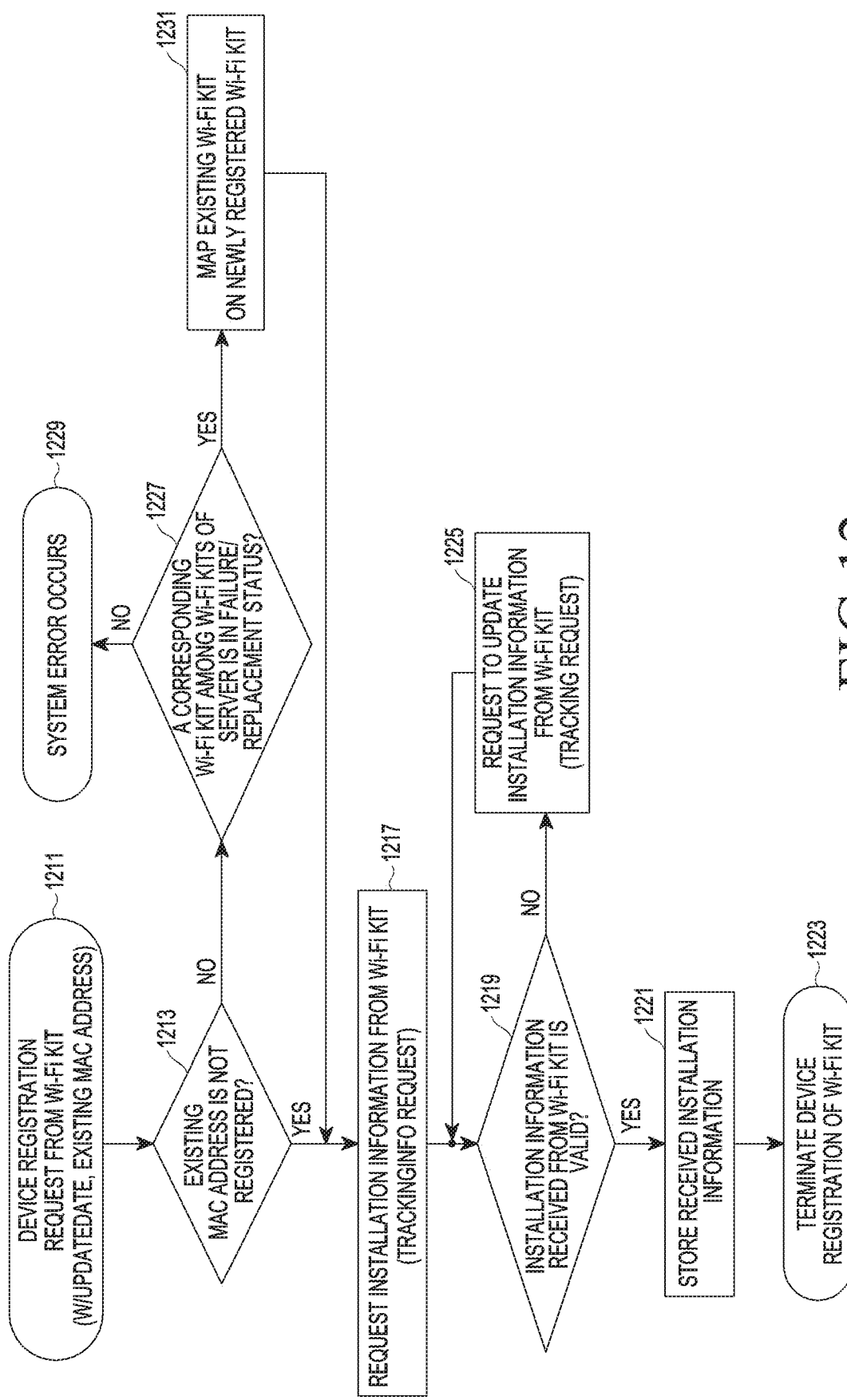
FIG. 12 schematically illustrates an operating process of a server in a process of replacing a Wi-Fi kit in an SAC system according to an embodiment of the present disclosure.

FIG. 12 schematically illustrates an operating process of a server in a process of replacing a Wi-Fi kit in an SAC system according to an embodiment of the present disclosure.

Referring to FIG. 12, a server detects a device registration request from a Wi-Fi kit at operation 1211, and proceeds to operation 1213. The server detects the device registration request upon receiving a device registration request message from the Wi-Fi kit, and the device registration request message includes an existing MAC address.

The server determines whether an existing MAC address is not registered at operation 1213. If the existing MAC address is not registered, the server proceeds to operation 1217. The server requests installation information from the Wi-Fi kit at operation 1217, and proceeds to operation 1219. The request of the installation information may be performed with a TrackingInfo Request message. The server determines whether the installation information received from the Wi-Fi kit is valid at operation 1219. If the installation information received from the Wi-Fi kit is valid, the server proceeds to operation 1221. The server stores the installation information received from the Wi-Fi kit at operation 1221, and proceeds to operation 1223.

The server terminates device registration for a Wi-Fi kit at operation 1223.

If the existing MAC address is registered at operation 1213, the server proceeds to operation 1227. The server determines whether a Wi-Fi kit which corresponds to the existing MAC address among Wi-Fi kits connected to the server is in a failure status and replacement status at operation 1227. If the Wi-Fi kit which corresponds to the existing MAC address among the Wi-Fi kits connected to the server is not in a failure status and replacement status, the server proceeds to operation 1229. The server determines that a system error occurs at operation 1229.

If the Wi-Fi kit which corresponds to the existing MAC address among the Wi-Fi kits connected to the server is in failure status and the replacement status, the server proceeds to operation 1231. The server maps an existing Wi-Fi kit on a newly registered Wi-Fi kit at operation 1231, and proceeds to operation 1217.

If the installation information received from the Wi-Fi kit is not valid, the server proceeds to operation 1225. The server transmits, to the Wi-Fi kit, installation information update request for requesting to update installation information at operation 1225, and returns to operation 1219. The installation information update request may be performed with a Tracking Request message.

For example, an operation process of a server in a process of replacing a Wi-Fi kit in an SAC system according to an embodiment of the present disclosure as shown in FIG. 12 describes a process related to whether to reuse the Tracking Info (installation information) of a device subordinately connected to a Wi-Fi kit which is newly installed when the Wi-Fi kit is newly installed as well as a process of replacing a Wi-Fi kit in an SAC system as described in FIGS. 10 and 11.

An operating process of a server in a process of replacing a Wi-Fi kit in an SAC system according to an embodiment of the present disclosure has been described with reference to FIG. 12, and the inner structure of an SAC in an SAC system according to an embodiment of the present disclosure will be described with reference to FIG. 13.

Figure 13:
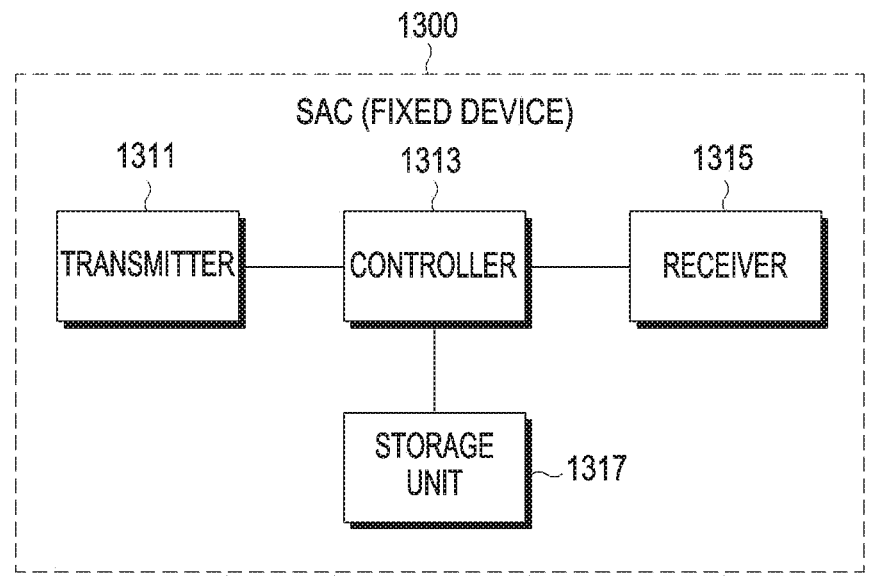
FIG. 13 schematically illustrates an inner structure of an SAC in an SAC system according to an embodiment of the present disclosure.

FIG. 13 schematically illustrates the inner structure of an SAC in an SAC system according to an embodiment of the present disclosure.

Referring to FIG. 13, an SAC 1300 includes a transmitter 1311, a controller 1313, a receiver 1315, and a storage unit 1317. The SAC 1300 may be a fixed device.

The controller 1313 controls the overall operation of the SAC 1300. More particularly, the controller 1313 controls an operation related to a process of registering an SAC, a process of estimating the location of a mobile device based on the location of the SAC, and a process of effectively replacing a Wi-Fi kit in an SAC system according to an embodiment of the present disclosure. The process of registering the SAC, the process of estimating the location of the mobile device based on the location of the SAC, and the process of effectively replacing the Wi-Fi kit in the SAC system according to an embodiment of the present disclosure have been described with reference to FIGS. 2 to 7 and 10 to 12, and a detailed description thereof will be omitted herein.

The transmitter 1311 transmits various signals and various messages to other devices, e.g., a mobile device, a server, and/or the like included in the SAC system under the control of the controller 1313. The various signals and various messages transmitted in the transmitter 1311 have been described with reference to FIGS. 2 to 7 and 10 to 12, and a detailed description thereof will be omitted herein.

The receiver 1315 receives various signals and various messages from the other devices included in the SAC system under the control of the controller 1313. The various signals and various messages received in the receiver 1315 have been described with reference to FIGS. 2 to 7 and 10 to 12, and a detailed description thereof will be omitted herein.

The storage unit 1317 stores various programs, various data, and/or the like related to the process of registering the SAC, the process of estimating the location of the mobile device based on the location of the SAC, and the process of effectively replacing the Wi-Fi kit in the SAC system according to an embodiment of the present disclosure performed in the SAC 1300 under the control of the controller 1313.

The storage unit 1317 stores various signals and various messages which are received by the receiver 1315 from the other devices.

However, while the transmitter 1311, the controller 1313, the receiver 1315, and the storage unit 1317 are described in the SAC 1300 as separate units, the SAC 1300 may be implemented with a form into which at least two of the transmitter 1311, the controller 1313, the receiver 1315, and the storage unit 1317 are incorporated.

The SAC 1300 may be implemented with one processor.

The inner structure of an SAC in an SAC system according to an embodiment of the present disclosure has been described with reference to FIG. 13, and the inner structure of a mobile device in an SAC system according to an embodiment of the present disclosure will be described with reference to FIG. 14.

Figure 14:
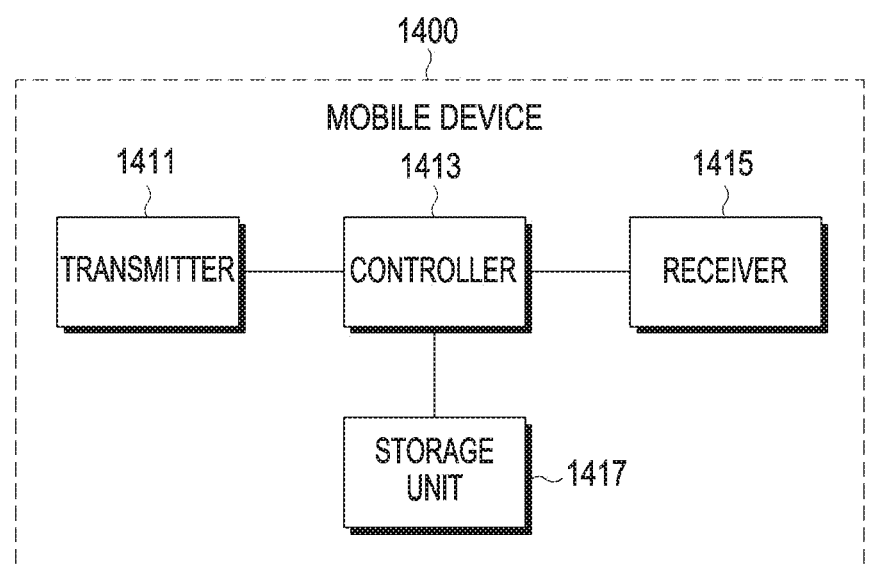
FIG. 14 schematically illustrates an inner structure of a mobile device in an SAC system according to an embodiment of the present disclosure.

FIG. 14 schematically illustrates the inner structure of a mobile device in an SAC system according to an embodiment of the present disclosure.

Referring to FIG. 14, a mobile device 1400 includes a transmitter 1411, a controller 1413, a receiver 1415, and a storage unit 1417.

The controller 1413 controls the overall operation of the mobile device 1400. More particularly, the controller 1413 controls an operation related to a process of registering an SAC, a process of estimating the location of a mobile device based on the location of the SAC, and a process of effectively replacing a Wi-Fi kit in an SAC system according to an embodiment of the present disclosure. The process of registering the SAC, the process of estimating the location of the mobile device based on the location of the SAC, and the process of effectively replacing the Wi-Fi kit in the SAC system according to an embodiment of the present disclosure have been described with reference to FIGS. 2 to 7 and 10 to 12, and a detailed description thereof will be omitted herein.

The transmitter 1411 transmits various signals and various messages to other devices, e.g., an SAC, a server, and/or the like included in the SAC system under the control of the controller 1413. The various signals and various messages transmitted in the transmitter 1411 have been described with reference to FIGS. 2 to 7 and 10 to 12, and a detailed description thereof will be omitted herein.

The receiver 1415 receives various signals and various messages from the other devices included in the SAC system under the control of the controller 1413. The various signals and various messages received in the receiver 1415 have been described with reference to FIGS. 2 to 7 and 10 to 12, and a detailed description thereof will be omitted herein.

The storage unit 1417 stores various programs, various data, and/or the like related to the process of registering the SAC, the process of estimating the location of the mobile device based on the location of the SAC, and the process of effectively replacing the Wi-Fi kit in the SAC system according to an embodiment of the present disclosure performed in the mobile device 1400 under the control of the controller 1413.

The storage unit 1417 stores various signals and various messages which are received by the receiver 1415 from the other devices.

However, while the transmitter 1411, the controller 1413, the receiver 1415, and the storage unit 1417 are described in the mobile device 1400 as separate units, the mobile device 1400 may be implemented with a form into which at least two of the transmitter 1411, the controller 1413, the receiver 1415, and the storage unit 1417 are incorporated.

The mobile device 1400 may be implemented with one processor.

The inner structure of a mobile device in an SAC system according to an embodiment of the present disclosure has been described with reference to FIG. 14, and the inner structure of a server in an SAC system according to an embodiment of the present disclosure will be described with reference to FIG. 15.

Figure 15:
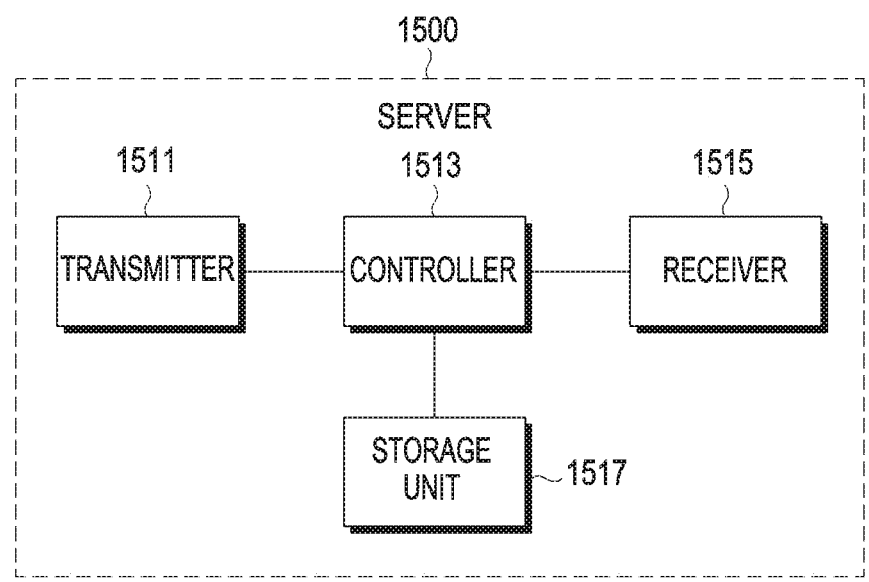
FIG. 15 schematically illustrates an inner structure of a server in an SAC system according to an embodiment of the present disclosure.

FIG. 15 schematically illustrates the inner structure of a server in an SAC system according to an embodiment of the present disclosure.

Referring to FIG. 15, a server 1500 includes a transmitter 1511, a controller 1513, a receiver 1515, and a storage unit 1517.

The controller 1513 controls the overall operation of the server 1500. More particularly, the controller 1513 controls an operation related to a process of registering an SAC, a process of estimating the location of a mobile device based on the location of the SAC, and a process of effectively replacing a Wi-Fi kit in an SAC system according to an embodiment of the present disclosure. The process of registering the SAC, the process of estimating the location of the mobile device based on the location of the SAC, and the process of effectively replacing the Wi-Fi kit in the SAC system according to an embodiment of the present disclosure have been described with reference to FIGS. 2 to 7 and 10 to 12, and a detailed description thereof will be omitted herein.

The transmitter 1511 transmits various signals and various messages to other devices, e.g., an SAC, a mobile device, and/or the like included in the SAC system under the control of the controller 1513. The various signals and various messages transmitted in the transmitter 1511 have been described with reference to FIGS. 2 to 7 and 10 to 12, and a detailed description thereof will be omitted herein.

The receiver 1515 receives various signals and various messages from the other devices included in the SAC system under the control of the controller 1513. The various signals and various messages received in the receiver 1515 have been described with reference to FIGS. 2 to 7 and 10 to 12, and a detailed description thereof will be omitted herein.

The storage unit 1517 stores various programs, various data, and/or the like related to the process of registering the SAC, the process of estimating the location of the mobile device based on the location of the SAC, and the process of effectively replacing the Wi-Fi kit in the SAC system according to an embodiment of the present disclosure performed in the server 1500 under the control of the controller 1513.

The storage unit 1517 stores various signals and various messages which are received by the receiver 1515 from the other devices.

However, while the transmitter 1511, the controller 1513, the receiver 1515, and the storage unit 1517 are described in the server 1500 as separate units, the server 1500 may be implemented with a form into which at least two of the transmitter 1511, the controller 1513, the receiver 1515, and the storage unit 1517 are incorporated.

Various embodiments of the present disclosure propose an operating method of a mobile device. The operating method of the mobile device comprises detecting a registration event for registering, at a server, location information of a fixed device to be installed, and transmitting, to the fixed device, identification information and location information of the mobile device in response to the detection of the registration event.

Herein, the identification information and location information of the mobile device are converted based on a format indicating an operation of the fixed device in the fixed device, and the converted identification information and location information of the mobile device are transmitted to the server.

Herein, the identification information and location information of the mobile device are mapped to an operation command sequence including operation commands for the fixed device, mapped to a code which corresponds to each of the operation commands for the fixed device, or mapped to the operation command sequence including the operation commands for the fixed device and the code which corresponds to each of the operation commands.

Herein, the operating method of the mobile device further comprises receiving, from the server, information indicating that the location information of the fixed device has been registered at the server, and displaying the information indicating that the location information of the fixed device has been registered at the server.

Various embodiments of the present disclosure propose an operating method of a mobile device. The operating method of the mobile device comprises transmitting location information of the mobile device to a server, detecting a registration event for registering, at the server, location information of a fixed device to be installed, and transmitting, to the fixed device, identification information of the mobile device in response to the detection of the registration event.

Herein, the identification information of the mobile device is converted based on a format indicating an operation of the fixed device in the fixed device, and the converted identification information of the mobile device is transmitted to the server.

Herein, the identification information of the mobile device is mapped to an operation command sequence including operation commands for the fixed device, mapped to a code which corresponds to each of the operation commands for the fixed device, or mapped to the operation command sequence including the operation commands for the fixed device and the code which corresponds to each of the operation commands.

Herein, the operating method of the mobile device further comprises receiving, from the server, information indicating that the location information of the fixed device has been registered at the server, and displaying the information indicating that the location information of the fixed device has been registered at the server.

Various embodiments of the present disclosure propose a method of registering a location. The method of registering the location comprises receiving, by a server from a fixed device, data related to an operation of the fixed device, estimating, by the server, location information of the fixed device based on the data, displaying and registering, by the server, the estimated location information of the fixed device, transmitting, by the server, to at least one of the mobile device and the fixed device, information indicating that the location information of the fixed device has been registered at the server, and displaying, by the at least one of the mobile device and the fixed device, the information indicating that the location information of the fixed device has been registered at the server.

Herein, the data is generated by converting the identification information and location information of the mobile device based on a format indicating an operation of the fixed device in the fixed device.

Herein, the identification information and location information of the mobile device are mapped to an operation command sequence including operation commands for the fixed device, mapped to a code which corresponds to each of the operation commands for the fixed device, or mapped to the operation command sequence including the operation commands for the fixed device and the code which corresponds to each of the operation commands.

Herein, the information indicating that the location information of the fixed device has been registered at the server is converted based on a format indicating an operation of the fixed device in the fixed device.

Various embodiments of the present disclosure propose a method of registering a location. The method of registering the location comprises receiving, by a server from a mobile device, location information of the mobile device, receiving, by the server, from a fixed device, data related to an operation of the fixed device, estimating, by the server, identification information of the mobile device based on the data, displaying and registering, by the server, the location information of the mobile device which corresponds to a time point at which the identification information of the mobile device is received as location information of the fixed device, transmitting, by the server, to at least one of the mobile device related to the fixed device and the fixed device, information indicating that the location information of the fixed device has been registered at the server, and displaying, by the at least one of the mobile device and the fixed device, the information indicating that the location information of the fixed device has been registered at the server.

Herein, the data is generated by converting the identification information of the mobile device based on a format indicating an operation of the fixed device in the fixed device.

Herein, the identification information of the mobile device is mapped to an operation command sequence including operation commands for the fixed device, mapped to a code which corresponds to each of the operation commands for the fixed device, or mapped to the operation command sequence including the operation commands for the fixed device and the code which corresponds to each of the operation commands.

Herein, the information indicating that the location information of the fixed device has been registered at the server is converted based on a format indicating an operation of the fixed device in the fixed device.

The server 1500 may be implemented with one processor.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A system, comprising:
   a server;
   a fixed device; and
   a mobile device,
   wherein the server comprises:
      a receiver,
      a transmitter, and
      a processor configured to:
         obtain, from the fixed device via the receiver, operation status information indicating the operation status which corresponds to operation commands obtained from the mobile device,
         obtain identification information of the mobile device and location information of the mobile device corresponding to the operation commands,
         estimate location information of the fixed device based on the location information of the mobile device,
         display and register the estimated location information of the fixed device, and
         control the transmitter to transmit, to at least one of the mobile device and the fixed device, information indicating that the location information of the fixed device has been registered at the server,
   wherein the at least one of the mobile device and the fixed device includes a processor configured to display the information indicating that the location information of the fixed device has been registered at the server.

2. The system of claim 1, wherein the operation status information is generated by converting the identification information and location information of the mobile device based on a format indicating an operation of the fixed device in the fixed device.

3. The system of claim 2, wherein the identification information and location information of the mobile device are mapped to an operation command sequence including operation commands for the fixed device, mapped to a code which corresponds to each of the operation commands for the fixed device, or mapped to the operation command sequence including the operation commands for the fixed device and the code which corresponds to each of the operation commands.

4. The system of claim 1, wherein the information indicating that the location information of the fixed device has been registered at the server is converted based on a format indicating an operation of the fixed device in the fixed device.

5. A system, comprising:
a server;
a fixed device; and
a mobile device,
wherein the server comprises:
a receiver,
a transmitter, and
a processor configured to:
obtain, from the mobile device via the receiver, location information of the mobile device,
obtain, from the fixed device via the receiver, operation status information indicating operation status which corresponds to operation commands obtained from the mobile device,
obtain operation commands which correspond to the received operation status information,
obtain identification information of the mobile device corresponding to the operation commands,
display and register the obtained location information of the mobile device as location information of the fixed device, and
control the transmitter to transmit, to at least one of the mobile device related to the fixed device and the fixed device, information indicating that the location information of the fixed device has been registered at the server,
wherein at least one of the mobile device or the fixed device includes a processor configured to display the information indicating that the location information of the fixed device has been registered at the server.

6. The system of claim 5, wherein the operation status information is generated by converting the identification information of the mobile device based on a format indicating an operation of the fixed device in the fixed device.

7. The system of claim 5,
wherein the identification information of the mobile device is mapped to an operation command sequence including operation commands for the fixed device, mapped to a code which corresponds to each of the operation commands for the fixed device, or mapped to the operation command sequence including the operation commands for the fixed device and the code which corresponds to each of the operation commands, or
wherein the information indicating that the location information of the fixed device has been registered at the server is converted based on a format indicating an operation of the fixed device in the fixed device.

* * * * *